United States Patent
Miyake et al.

(10) Patent No.: US 9,995,967 B2
(45) Date of Patent: Jun. 12, 2018

(54) LIQUID CRYSTAL DISPLAY DEVICE

(71) Applicant: Sharp Kabushiki Kaisha, Sakai, Osaka (JP)

(72) Inventors: Isamu Miyake, Sakai (JP); Koichi Miyachi, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days. days.

(21) Appl. No.: 15/329,658

(22) PCT Filed: Jul. 22, 2015

(86) PCT No.: PCT/JP2015/070762
§ 371 (c)(1),
(2) Date: Jan. 27, 2017

(87) PCT Pub. No.: WO2016/017483
PCT Pub. Date: Feb. 4, 2016

(65) Prior Publication Data
US 2017/0212390 A1    Jul. 27, 2017

(30) Foreign Application Priority Data

Jul. 29, 2014   (JP) ................................. 2014-154027

(51) Int. Cl.
*G02F 1/1337* (2006.01)
*C08G 73/10* (2006.01)
(Continued)

(52) U.S. Cl.
CPC .... *G02F 1/133711* (2013.01); *C08G 73/1007* (2013.01); *C08G 73/1078* (2013.01);
(Continued)

(58) Field of Classification Search
CPC ............ C08G 73/1007; C08G 73/1078; C08G 73/1096; C09K 19/3001; C09K 19/3068;
(Continued)

(56) References Cited

U.S. PATENT DOCUMENTS

2009/0128540 A1    5/2009  Hsu
2011/0300781 A1*  12/2011  Miyata ................. B24B 37/042
                                                         451/54
(Continued)

FOREIGN PATENT DOCUMENTS

JP           5493596 B2       5/2014
JP        2015-043070 A       3/2015
(Continued)

OTHER PUBLICATIONS

Official Communication issued in International Patent Application No. PCT/JP2015/070762, dated Oct. 20, 2015.
(Continued)

*Primary Examiner* — Sophie Hon
(74) *Attorney, Agent, or Firm* — Keating & Bennett, LLP

(57) ABSTRACT

The present invention provides a liquid crystal display device with reduced power consumption as well as reduced flicker. The liquid crystal display device is one in a transverse electric field mode, including: paired substrates; a photo-alignment film disposed on at least one of the substrates; a horizontal alignment liquid crystal layer disposed between the substrates; and pixels arranged in a matrix form, the liquid crystal layer containing liquid crystal molecules with a bicyclohexyl skeleton and liquid crystal molecules with a difluorobenzene skeleton, the liquid crystal layer having negative anisotropy of dielectric constant, one of the substrates including TFTs disposed in the respective pixels, the TFTs each including a semiconductor layer that contains an oxide semiconductor, the liquid crystal display device having a frame rate of lower than 50 Hz.

12 Claims, 7 Drawing Sheets

(51) Int. Cl.
*C09K 19/56* (2006.01)
*C09K 19/30* (2006.01)
*C09K 19/32* (2006.01)
*G02F 1/1343* (2006.01)
*G02F 1/1368* (2006.01)
*G02F 1/1339* (2006.01)
*C09K 19/04* (2006.01)

(52) U.S. Cl.
CPC ...... *C08G 73/1096* (2013.01); *C09K 19/3001* (2013.01); *C09K 19/3068* (2013.01); *C09K 19/32* (2013.01); *C09K 19/56* (2013.01); *G02F 1/1339* (2013.01); *G02F 1/1368* (2013.01); *G02F 1/133788* (2013.01); *G02F 1/134363* (2013.01); *C09K 2019/0448* (2013.01); *C09K 2019/3075* (2013.01); *G02F 2001/133738* (2013.01); *G02F 2001/133749* (2013.01); *G02F 2001/134372* (2013.01); *G02F 2202/10* (2013.01); *Y10T 428/1023* (2015.01)

(58) Field of Classification Search
CPC .............. C09K 19/32; C09K 19/56; C09K 2019/0448; C09K 2019/3075; G02F 1/133711; G02F 1/133788; G02F 1/1339; G02F 1/134363; G02F 1/1368; G02F 2001/133738; G02F 2001/133749; G02F 2001/134372; G02F 2202/10; Y10T 428/1023
USPC ....................................................... 428/1.26
See application file for complete search history.

(56) References Cited

U.S. PATENT DOCUMENTS

| | | | |
|---|---|---|---|
| 2013/0114010 A1* | 5/2013 | Goetz | C08F 220/30 349/33 |
| 2013/0196565 A1 | 8/2013 | Miyake et al. | |
| 2013/0222740 A1 | 8/2013 | Miyachi et al. | |
| 2013/0271713 A1 | 10/2013 | Miyake et al. | |
| 2014/0173893 A1* | 6/2014 | Nagao | G02F 1/133788 29/829 |
| 2014/0218667 A1* | 8/2014 | Miyachi | G02F 1/133703 349/99 |
| 2014/0347588 A1 | 11/2014 | Hatsumi et al. | |
| 2016/0075945 A1* | 3/2016 | Iwashita | C09K 19/3003 252/299.63 |

FOREIGN PATENT DOCUMENTS

| | | |
|---|---|---|
| WO | 2012/050177 A1 | 4/2012 |
| WO | 2013/024749 A1 | 2/2013 |
| WO | 2014/057578 A1 | 4/2014 |

OTHER PUBLICATIONS

Takatsu, "Development and Industrialization of Liquid Crystal Materials", DIC Technical Review, No. 11, 2005, pp. 29-36.

* cited by examiner

LIQUID CRYSTAL DISPLAY DEVICE

TECHNICAL FIELD

The present invention relates to liquid crystal display devices. More specifically, the present invention relates to a liquid crystal display device that can be driven at a low frequency.

BACKGROUND ART

Recent display devices with reduced size and weight, such as flat panel displays (FPDs), achieve high performance. Such display devices, for example liquid crystal display devices, are now installed in various electronic devices. In particular, reduction in power consumption is an issue in portable electronic devices, and thus devices with lower power consumption have been developed.

In the field of liquid crystal display devices, a polymer sustained (PS) alignment technique has been developed. For example, Patent Literature 1 discloses a liquid crystal display device comprising: a liquid crystal cell that includes a pair of substrates and a liquid crystal layer which is held between the pair of substrates, wherein at least one substrate of the pair of substrates includes an electrode, an undercoat film which is formed on a liquid crystal layer side of the electrode, and a polymer layer which is formed on a liquid crystal layer side of the undercoat film and controls the alignment of liquid crystal molecules adjacent to the polymer layer, the undercoat film is formed of a photoactive material, the polymer layer is formed by polymerization of a monomer added to the liquid crystal layer, and the liquid crystal layer contains liquid crystal molecules having, in a molecular structure thereof, a multiple bond other than conjugated double bonds of a benzene ring.

Also, Patent Literature 2 and Non-Patent Literature 1, for example, disclose various materials developed as liquid crystal materials for liquid crystal display devices.

CITATION LIST

Patent Literature
Patent Literature 1: WO 2012/050177
Patent Literature 2: JP 5493596 B
Non-Patent Literature
Non-Patent Literature 1: TAKATSU Haruyoshi, "Development and Industrialization of Liquid Crystal Materials", DIC Technical Review, No. 11 (2005), pp. 29-36, [online], DIC Corporation, [searched on Jul. 28, 2014], the Internet <http://www.dic-global.com/ja/r_and_d/review/pdf/dic_r_and_d_2005_review03.pdf>

SUMMARY OF INVENTION

Technical Problem

The power consumed by drive circuits accounts for a large proportion of the power consumed by display devices. The power consumed by drive circuits is proportional to the driving frequency of the circuits. Hence, an effective way to reduce the power consumed by a display device is to decrease the frame rate of the display device and thereby decrease the driving frequency of the drive circuit.

In the case of driving a liquid crystal display device with TFTs at a low frequency (a low frequency as used herein is a frequency of lower than 50 Hz), however, a problem of flicker (screen flickering) arises. Typical small-to-medium sized liquid crystal display devices are usually driven at 60 Hz for the purpose of preventing flicker.

The main causes of flicker are: 1) a low voltage holding ratio (VHR) of the liquid crystal display device; and 2) polarization by the flexo-electric effect (hereinafter, the polarization is referred to as flexo-polarization) in the liquid crystal layer.

1) The main cause of a decrease in VHR is impurity ions contained in the liquid crystal. In a conventional liquid crystal display device, these impurity ions move within the liquid crystal layer to reduce the effective voltage applied to the liquid crystal layer, which is perceived as a luminance change. The off-leakage current of a TFT, i.e., the leakage current of the TFT under a gate-off condition (with no scanning signal input to the gate electrode of the TFT), may also reduce the voltage applied to the liquid crystal layer.

FIG. 13 is a graph showing changes relative to time in the luminance of a liquid crystal display device, showing the luminance changes caused by impurity ions and off-leakage current of a TFT.

As shown in FIG. 13, the luminance changes during one frame due to the impurity ions and/or the off-leakage current of the TFT. The luminance change is perceived as flicker.

2) Flexo-polarization is coupled with an electric field generated in the liquid crystal layer to change the strength of the electric field, causing a luminance change. This luminance change is perceived as flicker. Flexo-polarization is considered to occur when the pre-tilt angle is set high and the degree of asymmetry of the liquid crystal alignment is high between electrodes, or when the alignment of liquid crystal having positive anisotropy of dielectric constant tends to change locally at points such as vicinities of electrode edges with voltage applied.

FIG. 14 is a graph showing changes relative to time in the luminance of a liquid crystal display device, showing the luminance changes caused by flexo-polarization.

As shown in FIG. 14, the luminance changes during one frame due to flexo-polarization. The luminance change is perceived as flicker.

These results show that in the case of driving a liquid crystal display device with TFTs, a luminance decrease involved in a VHR decrease or a luminance change involved in flexo-polarization is unfortunately perceived as flicker. Hence, in the case of decreasing the driving frequency of the drive circuit by decreasing the frame rate of a liquid crystal display device, the display device can still be improved in terms of flicker reduction.

The liquid crystal display device disclosed in Patent Literature 1 includes a polymer layer formed by polymerizing monomers added to the liquid crystal layer, and radicals generated in the polymerization of the monomers can remain as impurity monomers in the liquid crystal layer. Also, the radicals can react with other molecules to generate impurity ions. Accordingly, the liquid crystal display device disclosed in Patent Literature 1 can also be further improved in terms of the above point. Furthermore, Patent Literature 1 aims to reduce image sticking caused by application of alternating current (AC), and does not solve the problem with low frequency drive.

The present invention has been made in view of such a current state of the art, and aims to provide a liquid crystal display device with reduced power consumption as well as reduced flicker.

Solution to Problem

One aspect of the present invention may be a liquid crystal display device in a transverse electric field mode, including:

paired substrates;

a photo-alignment film disposed on at least one of the substrates;

a horizontal alignment liquid crystal layer disposed between the substrates; and pixels arranged in a matrix form, the liquid crystal layer containing liquid crystal molecules with a bicyclohexyl skeleton and liquid crystal molecules with a difluorobenzene skeleton, the liquid crystal layer having negative anisotropy of dielectric constant, one of the substrates including TFTs disposed in the respective pixels, the TFTs each including a semiconductor layer that contains an oxide semiconductor, the liquid crystal display device having a frame rate of lower than 50 Hz.

Hereinafter, this liquid crystal display device is also referred to as the display device of the present invention.

Preferred embodiments of the display device of the present invention are described below. The following preferred embodiments may appropriately be combined with each other. Any embodiment obtained by combining two or more of the following preferred embodiments is also one preferred embodiment.

The display device of the present invention may further include a backlight including an LED.

The backlight may have variable luminance.

The liquid crystal layer may be formed by sealing, between the substrates, a liquid crystal material containing the liquid crystal molecules with the bicyclohexyl skeleton and the liquid crystal molecules with the difluorobenzene skeleton.

The liquid crystal material may not contain any polymerizable monomers.

The liquid crystal layer may be formed by irradiation of the liquid crystal material sealed between the substrates with light.

The liquid crystal material may contain the liquid crystal molecules with the bicyclohexyl skeleton, the liquid crystal molecules with the difluorobenzene skeleton, and a polymerizable monomer.

The liquid crystal material as a whole may contain the polymerizable monomer at a concentration of lower than 0.4% by mass before the irradiation with light.

The display device of the present invention may further include a sealant disposed between the substrates and surrounding the liquid crystal layer.

The sealant may have a width of greater than 0.1 mm.

The photo-alignment film may contain at least one of polyamic acid and polyimide which are obtained by a reaction of m-tolidine and an acid dianhydride.

The acid dianhydride may be 1,2,3,4-cyclobutanetetracarboxylic dianhydride.

A pre-tilt angle in the liquid crystal layer may be substantially zero.

The photo-alignment film may be formed from a polymer containing a photo-functional group.

The photo-functional group may undergo at least one reaction selected from the group consisting of photo-isomerization, photo-dimerization, photo-cross-linking, photo-decomposition, and photo-Fries rearrangement reactions.

The polymer may contain, as the photo-functional group, at least one skeleton selected from the group consisting of cinnamate, chalcone, azobenzene, stilbene, coumarin, phenyl ester, and cyclobutane skeletons.

The oxide semiconductor may be an In—Ga—Zn—O-based oxide semiconductor.

The transverse electric field mode may be an IPS mode.

The transverse electric field mode may be an FFS mode.

Advantageous Effects of Invention

The present invention can achieve a liquid crystal display device with reduced power consumption as well as reduced flicker.

DESCRIPTION OF EMBODIMENTS

Figure 1:
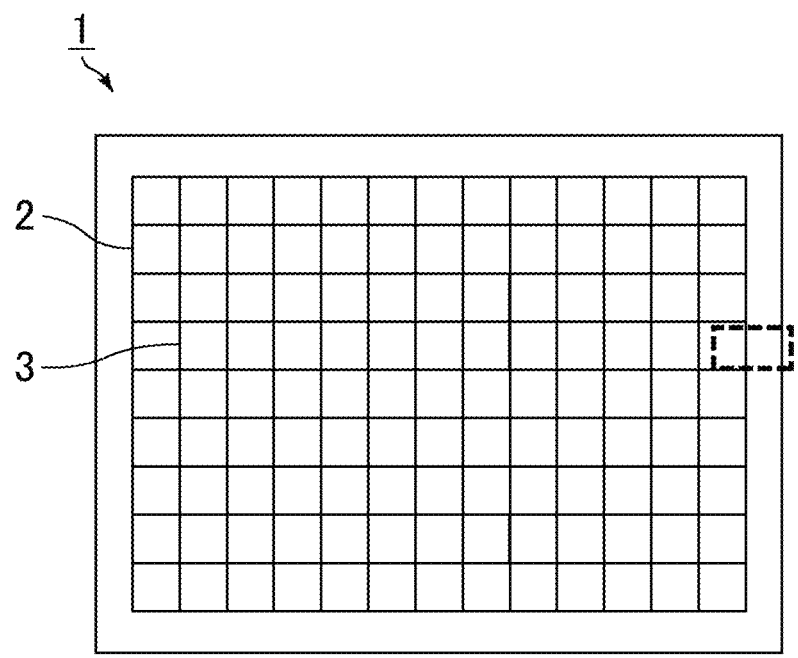
FIG. 1 is a schematic plan view of a liquid crystal display device of Embodiment 1.

Hereinafter, embodiments and examples of the present invention are described with reference to the drawings. The embodiments and examples, however, are not intended to limit the scope of the present invention. Also, the configurations of the embodiments and examples may appropriately be combined or modified within the spirit of the present invention. In the drawings, components exerting the same or similar function are provided with the same reference sign.

Embodiment 1

FIG. 1 is a schematic plan view of a liquid crystal display device of Embodiment 1.

A liquid crystal display device (liquid crystal panel) 1 of the present embodiment is an active matrix liquid crystal display device in a transverse electric field mode. As illustrated in FIG. 1, the liquid crystal display device 1 includes a display region 2 in which images (screen) are displayed. The display region 2 is formed by pixels 3 arranged in a matrix form.

Figure 2:
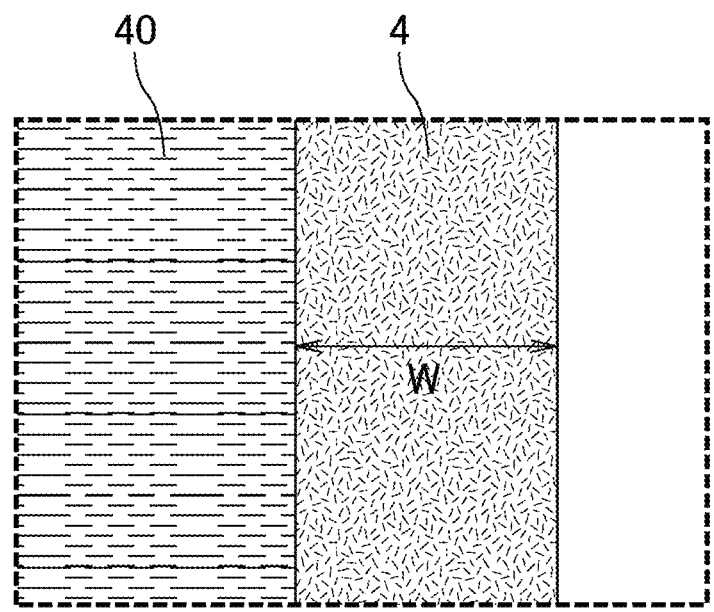
FIG. 2 is another schematic plan view of the liquid crystal display device of Embodiment 1, which is an enlarged view of the region surrounded by the dashed line in FIG. 1.
Figure 3:
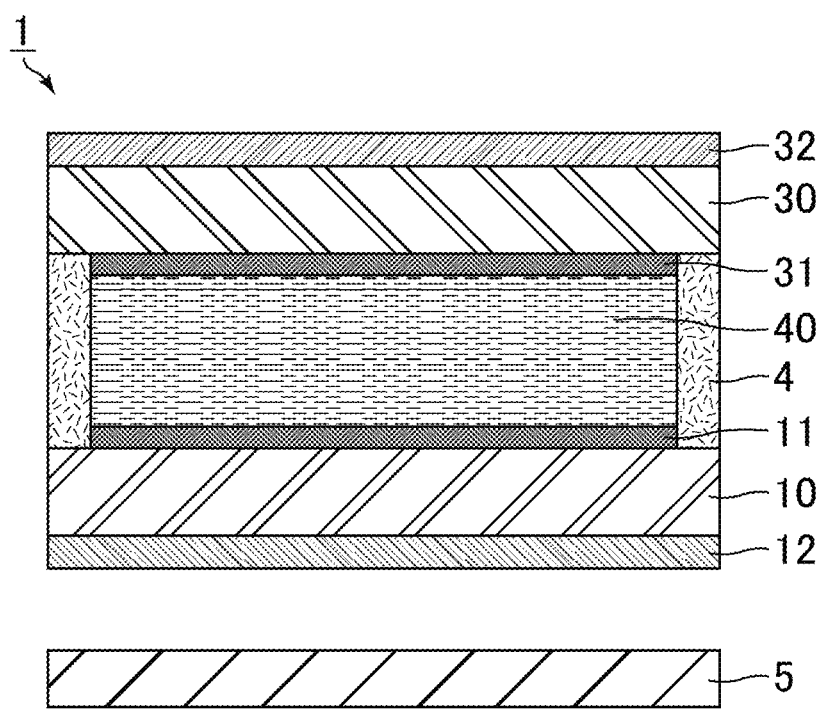
FIG. 3 is a schematic cross-sectional view of the liquid crystal display device of Embodiment 1.

FIG. 2 is another schematic plan view of the liquid crystal display device of Embodiment 1, which is an enlarged view of the region surrounded by the dashed line in FIG. 1. FIG. 3 is a schematic cross-sectional view of the liquid crystal display device of Embodiment 1.

As illustrated in FIGS. 2 and 3, the liquid crystal display device 1 includes paired substrates 10 and 30; a horizontal alignment liquid crystal layer 40 held between the substrates 10 and 30; photo-alignment films 11 and 31 disposed on the respective liquid crystal layer 40 side surfaces of the substrates 10 and 30; polarizers 12 and 32 disposed on the respective surfaces of the substrates 10 and 30 on the sides opposite to the liquid crystal layer 40; a linear sealant 4 disposed between the substrates 10 and 30 to surround the pixels 3, i.e., the display region 2; a backlight 5 disposed behind the substrate 10; drive circuits (not illustrated) such as a gate line drive circuit and a source line drive circuit; and a timing controller.

Figure 4:
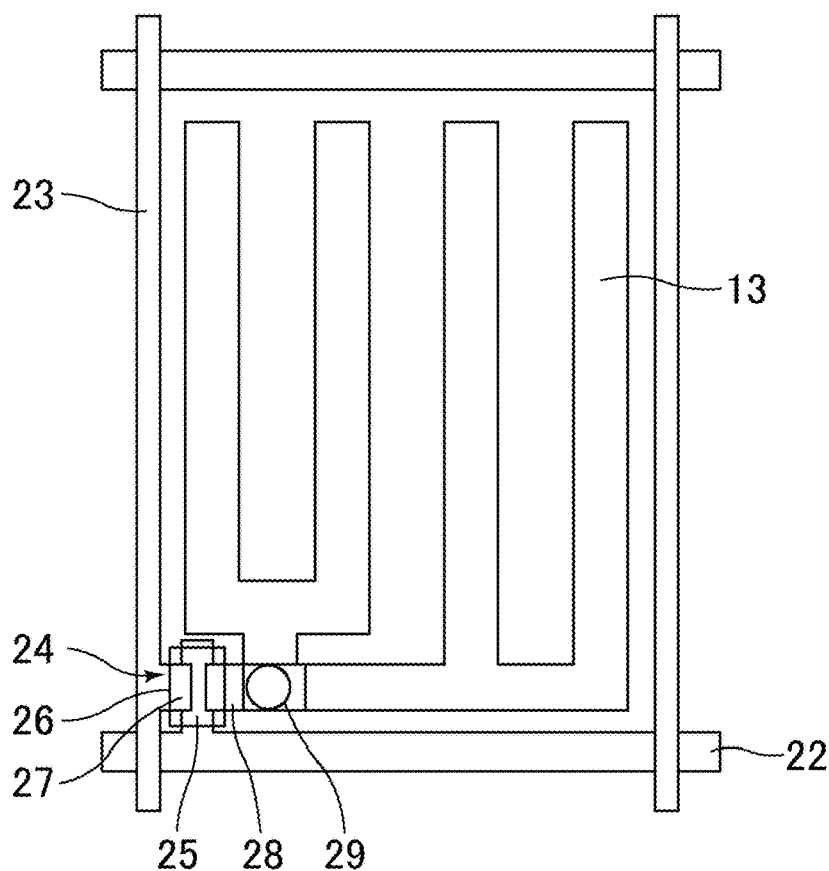
FIG. 4 is a schematic plan view illustrating the structure of each pixel in the liquid crystal display device of Embodiment 1.

FIG. 4 is a schematic plan view illustrating the structure of each pixel in the liquid crystal display device of Embodiment 1.

The substrate 10 is an array substrate that is positioned on the back surface side (non-viewer side), and includes a transparent insulating substrate such as a glass substrate. As illustrated in FIG. 4, the substrate 10 includes gate lines (gate bus lines) 22 disposed on an insulating substrate (not illustrated); a gate insulator (not illustrated) that covers the gate lines 22; source lines (source bus lines) 23 disposed on the gate insulator; TFTs 24 disposed in the respective pixels 3; an interlayer insulating film (not illustrated in FIG. 4) that covers the TFTs 24; and pixel electrodes 13 and a common electrode (not illustrated in FIG. 4) disposed on the interlayer insulating film.

The pixel electrodes 13 are provided individually in the respective pixels 3. A common electrode may be provided for each pixel 3 or for each group of some pixels 3, or may be provided to cover all the pixels 3. To the common electrode are supplied common signals that are common to all the pixels 3. The pixel electrodes 13 and the common electrode are made of a transparent conductive material such as indium tin oxide (ITO) or indium zinc oxide (IZO).

Figure 5:
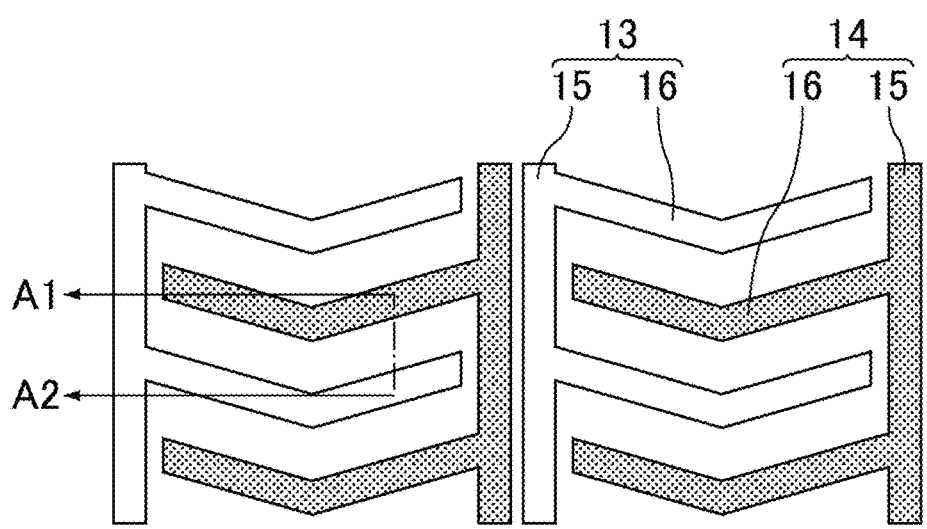
FIG. 5 is a schematic plan view illustrating an electrode arrangement of the liquid crystal display device of Embodiment 1.
Figure 6:
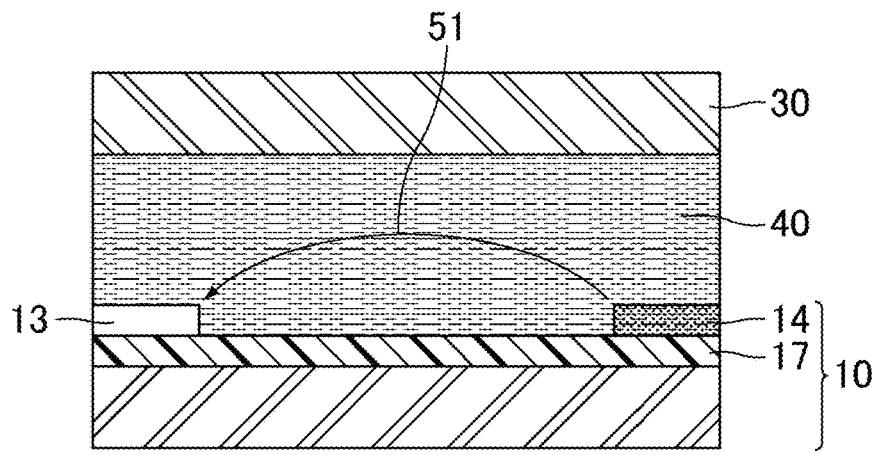
FIG. 6 is a schematic cross-sectional view illustrating the electrode arrangement of the liquid crystal display device of Embodiment 1 in a cross section taken along the line A1-A2 in FIG. 5.

FIG. 5 is a schematic plan view illustrating an electrode arrangement of the liquid crystal display device of Embodiment 1. FIG. 6 is a schematic cross-sectional view illustrating the electrode arrangement of the liquid crystal display device of Embodiment 1 in a cross section taken along the line A1-A2 in FIG. 5. FIGS. 5 and 6 illustrate the case of employing the in-plane switching mode as the transverse electric field mode.

In the case of employing the IPS mode as the transverse electric field mode, as illustrated in FIG. 5, each of the pixel electrodes 13 and a common electrode 14 are paired comb electrodes whose comb teeth fit each other in the corresponding pixel 3, and each include a trunk 15 and branches (comb teeth) 16 that arise from the trunk 15 and are parallel to each other. The branches 16 of the paired electrodes are alternately disposed with a certain interval (space) in between. As illustrated in FIG. 6, the pixel electrodes 13 and the common electrode 14 are disposed on an interlayer insulating film 17. Upon application of voltage between the pixel electrodes 13 and the common electrode 14, electric fields 51 substantially parallel to the substrate 10 are generated in the vicinities of the spaces in the liquid crystal layer 40.

Figure 7:
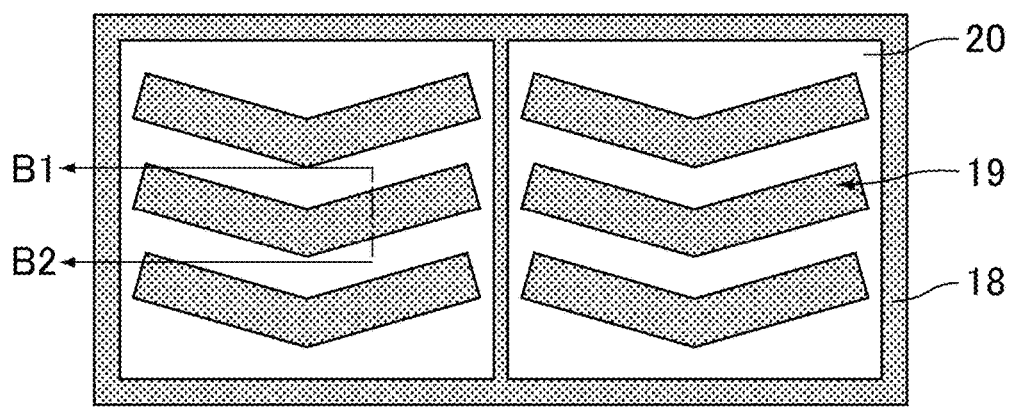
FIG. 7 is a schematic plan view illustrating another electrode arrangement of the liquid crystal display device of Embodiment 1.
Figure 8:
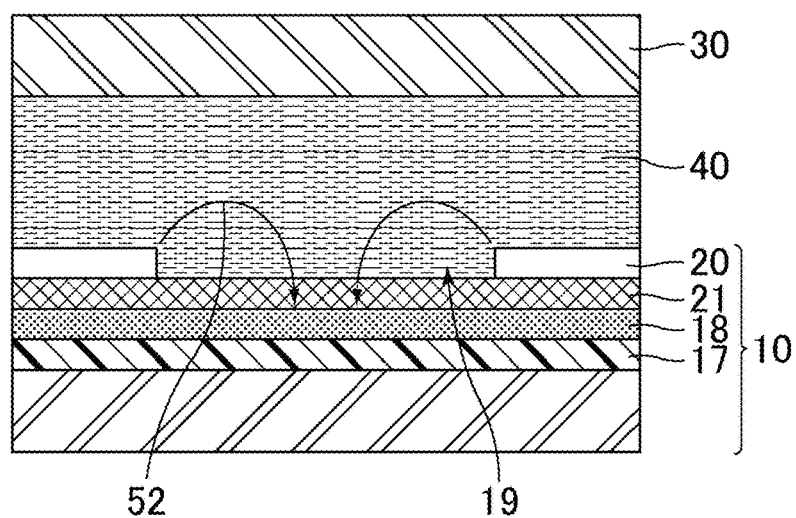
FIG. 8 is a schematic cross-sectional view illustrating the electrode arrangement of the liquid crystal display device of Embodiment 1 in a cross section taken along the line B1-B2 in FIG. 7.

FIG. 7 is a schematic plan view illustrating another electrode arrangement of the liquid crystal display device of Embodiment 1. FIG. 8 is a schematic cross-sectional view illustrating the electrode arrangement of the liquid crystal display device of Embodiment 1 in a cross section taken along the line B1-B2 in FIG. 7. FIGS. 7 and 8 illustrate the case of employing the fringe field switching (FFS) mode as the transverse electric field mode.

In the case of employing the FFS mode as the transverse electric field mode, as illustrated in FIG. 7, one of the pixel electrode and the common electrode is a planar electrode 18 and the other is an electrode 20 in which electrode slits (no electrode portions) 19 parallel to each other are formed. As illustrated in FIG. 8, the planar electrode 18 is disposed on the interlayer insulating film 17, an insulating film 21 is disposed on the electrode 18, and the electrode 20 with the electrode slits 19 is disposed on the insulating film 21. The electrode 20 is stacked on the electrode 18 with the insulating film 21 in between. Upon application of voltage between the electrodes 18 and 20, i.e., between the pixel electrodes 13 and the common electrode 14, parabolic electric fields (fringe electric fields) 52 are generated in the vicinities of the electrode slits 19 in the liquid crystal layer 40.

The TFTs 24 are switching active elements, and are provided at the respective intersections of the gate lines 22 and the source lines 23, for example, in the respective pixels 3 as illustrated in FIG. 4. Each TFT 24 includes a gate electrode 25 electrically connected to the corresponding gate line 22, a gate insulator, a semiconductor layer 26 disposed on the gate insulator, a source electrode 27 designed to electrically connect the semiconductor layer 26 to the corresponding source line 23, and a drain electrode 28 designed to electrically connect the semiconductor layer 26 to the corresponding pixel electrode 13. The interlayer insulating film includes contact holes 29 corresponding to the drain electrodes 28 of the respective TFTs 24. Each pixel electrode 13 is electrically connected to the drain electrode 28 of the corresponding TFT 24 through the corresponding contact hole 29.

The substrate 30 is a counter substrate positioned on the front surface side (display surface side, viewer side), and includes a transparent insulating substrate such as a glass substrate and a black matrix provided on the liquid crystal layer 40 side surface of the insulating substrate. The substrate 30 is attached to the substrate 10 by the sealant 4. In the case of color display, the substrate 30 may further include color filters.

In the case of color display, the pixels 3 each consist of sub-pixels in multiple colors. Each sub-pixel has the same configuration as that of each pixel 3 described above.

The drive method of the pixels 3 is the same as that of common liquid crystal display devices except that the driving frequency is lower than the driving frequency (typically 60 Hz) of the common liquid crystal display devices. Each gate line 22 supplies a scanning signal to the TFTs 24 connected to the gate line 22. Each source line 23 supplies a display signal to the TFT(s) 24 whose gate electrode 25 has received the scanning signal among the TFTs 24 connected to the source line 23. The scanning signal and the display signal are supplied (input) from the gate line drive circuit and the source line drive circuit to each gate line 22 and each source line 23, respectively. The gate line drive circuit supplies a scanning signal to the gate lines 22 by selecting the gate lines 22 in a given order. Here, the configurations of the drive circuits such as the gate line drive circuit and the source line drive circuit may be the same as those in a typical liquid crystal display device.

The liquid crystal display device 1 has a frame rate of lower than 50 Hz, preferably 30 Hz or lower, more preferably 20 Hz or lower, particularly preferably 5 Hz or lower. With such a frame rate, the power consumed by the liquid crystal display device 1 can be reduced. Herein, the frame rate means the number of times that the pixel electrode 13 of a given pixel 3 is electrically charged by the source line 23 per second. In other words, the frame rate is the number of times that a given gate line 22 is selected and thereby a given TFT 24 is turned on per second.

In yet other words, the frame rate means the number of times that a given source line 23 is electrically connected to a given pixel electrode 13 via the corresponding TFT 24.

The lower limit of the frame rate of the liquid crystal display device 1 is not particularly limited, but is preferably 0.01 Hz or higher, more preferably 0.1 Hz or higher, still more preferably 0.5 Hz or higher. A typical liquid crystal panel prevents image sticking by inverting the polarity of voltage applied to each of the pixel electrodes and the common electrode for each frame. In the present embodiment, with a very low frame rate, inverting the polarity of voltage applied to each of the pixel electrodes and the common electrode for each frame may result in application of positive (negative) voltage to the liquid crystal layer 40 for a long period of time, causing image sticking. Accordingly, the polarity of voltage applied to the liquid crystal layer 40 is preferably inverted within a period of time that does not cause image sticking. From this viewpoint, the frame rate is preferably set with a lower limit.

The frame rate can be determined by measuring the change with time in the luminance of light passing through the driven liquid crystal panel using a photodiode and an oscilloscope. Also, the frame rate can be set to a desired value using the timing controller.

The semiconductor layer 26 of each TFT 24 contains an oxide semiconductor. In the case of using a semiconductor such as a-Si (amorphous silicon) or polysilicon (e.g., low temperature polysilicon (LTPS)) as the material of the semiconductor layer, the charge supplied to the pixel electrode cannot be retained due to the off-leakage current of the TFT, thus leading to flicker perception. In contrast, the off-leakage current of the TFTs 24 containing an oxide semiconductor is lower than the off-leakage current of TFTs containing a semiconductor such as a-Si or polysilicon. Hence, with use of an oxide semiconductor as the material of the semiconductor layer 26, a drop of the applied voltage can be reduced even with a low frame rate, VHR can be increased, and flicker can be reduced.

Examples of the oxide semiconductor include metal oxides represented by the formula: $InMO_3(ZnO)_m$ (m>0). M represents at least one metal element selected from the group consisting of Ga, Fe, Ni, Mn, and Co. For example, M may contain Ga alone, or may contain Ga and any of the above metal elements in combination (e.g., Ga and Ni in combination, Ga and Fe in combination). The metal oxide may contain Fe, Ni, any other transition metal element, or an oxide of the transition metal element, as well as the metal element(s) contained as M. In the above formula, m may not be an integer. In the case that m is not an integer, an oxide semiconductor containing Ga as M is referred to as an In—Ga—Zn—O-based oxide semiconductor, and a thin film formed therefrom is also referred to as an In—Ga—Zn—O-based semiconductor film. The In—Ga—Zn—O-based oxide semiconductor is particularly suited for the material of the semiconductor layer 26 in each TFT 24. Use of such an In—Ga—Zn—O-based oxide semiconductor enables particularly effective decrease in the off-leakage current of each TFT 24.

The oxide semiconductor may suitably be a metal oxide other than the above ones, such as an In—Sn—Zn—O-based, In—Al—Zn—O-based, Sn—Ga—Zn—O-based, Al—Ga—Zn—O-based, Sn—Al—Zn—O-based, In—Zn—O-based, Sn—Zn—O-based, Al—Zn—O-based, In—O-based, Sn—O-based, or Zn—O-based metal oxide.

Also, silicon oxide may be contained in the semiconductor layer 26 containing any of the above metal oxide.

The transverse electric field mode is a method of generating electric fields containing components (parallel components) that are parallel to the surface of each of the substrates 10 and 30 (hereinafter, such electric fields are also referred to as transverse electric fields) in the liquid crystal layer 40, thereby controlling the alignment of liquid crystal constituting the liquid crystal layer 40. Transverse electric fields are generated when voltage corresponding to the display signal is applied between the pixel electrodes 13 and the common electrode 14. The transverse electric fields include the electric fields 51 substantially parallel to the substrate 10 in the IPS mode and the parabolic electric fields 52 in the FFS mode.

Another possible mode for controlling the liquid crystal alignment other than the transverse electric field mode is a vertical electric field mode. A vertical electric field mode generates electric fields (vertical electric fields) mainly containing components (perpendicular components) that are perpendicular to the surface of each substrate in the liquid crystal layer, thereby controlling the alignment of liquid crystal constituting the liquid crystal layer.

The transverse electric field mode can form larger parallel capacitance (storage capacitance) than the vertical electric field driving. The present embodiment employing a transverse electric field mode can therefore reduce a decrease in VHR and can lead to a lesser chance of flicker perception. A transverse electric field mode is thus suitable for low frequency drive. The parallel capacitance is capacitance formed in parallel with the liquid crystal capacitance (capacitance with the liquid crystal as a dielectric).

The transverse electric field mode is not particularly limited, but is suitably the IPS mode or the FFS mode.

In the IPS mode, as illustrated in FIG. 5, the structures of the comb electrodes (pixel electrode 13 and common electrode 14) except for the ends of the branches (comb teeth) 16 are symmetrical. The symmetrical electrode structures can cancel the flexo-polarization. Accordingly, the IPS mode can reduce the flexo-polarization and minimize flicker. The IPS mode is therefore suitable for low frequency drive. Also, the IPS mode can be effective in reducing a drop of the effective voltage applied to the liquid crystal because, upon application of voltage between the comb electrodes, parallel capacitance with the insulating substrate as a dielectric is formed between the comb electrodes. Also from this viewpoint, the IPS mode is suitable for low frequency drive.

In the FFS mode, as illustrated in FIG. 7, the structures of the pixel electrode 13 and the common electrode 14 are asymmetrical, which is likely to cause flexo-polarization. Also, the FFS mode is susceptible to the luminance change involved in the flexo-polarization. The FFS mode therefore seems to be disadvantageous in terms of flicker prevention. Still, as described later, since the anisotropy of dielectric constant ($\Delta\varepsilon$) of the liquid crystal layer 40 in the present embodiment is negative, not positive, the liquid crystal molecules with voltage applied (when driven) are aligned in the direction perpendicular to the lines of electric force. This means that the liquid crystal molecules can be aligned in a plane parallel to each of the substrates 10 and 30, so that the FFS mode also can reduce the chance of flexo-polarization generation. Also, the FFS mode can be effective in reducing a drop of the effective voltage applied to the liquid crystal because, upon application of voltage between the pixel electrodes 13 and the common electrode 14, large parallel capacitance with the insulating film 21 as a dielectric is formed between the pixel electrodes 13 and the common electrode 14. Accordingly, the FFS mode can also lead to a lesser chance of flicker perception, and is therefore suitable for low frequency drive.

The photo-alignment films 11 and 31 are continuously formed to cover at least the entire display region 2. Each of the photo-alignment films 11 and 31 can align the nearby liquid crystal molecules in a direction substantially parallel to the film surface. The photo-alignment films 11 and 31 function as horizontal alignment films.

The photo-alignment films 11 and 31 have been irradiated with light (preferably ultraviolet light, more preferably polarized ultraviolet light) for alignment treatment. Since the photo-irradiation is a non-contact treatment differently from a contact treatment such as rubbing, use of the photo-alignment films 11 and 31 here lessens the chance of surface staining of the photo-alignment films 11 and 31, thereby minimizing sticking of impurities to the surface of each of the photo-alignment films 11 and 31. The photo-alignment films can therefore reduce a decrease in VHR due to those impurities.

Also, in the case of using rubbed alignment films, some pre-tilt angle is formed and the degree of symmetry of the liquid crystal alignment in a plane parallel to each substrate is decreased. This may increase the flexo-polarization to increase the chance of flicker perception. In contrast, in the case of using the photo-alignment films 11 and 31, the pre-tilt angle can be made substantially zero, so that the degree of symmetry of the liquid crystal alignment in a plane parallel to each of the substrates 10 and 30 can be increased. Accordingly, the photo-alignment films can reduce flexo-polarization and reduce flicker perception.

As described above, from the viewpoint of flexo-polarization reduction, the pre-tilt angle in the liquid crystal layer 40 is preferably substantially zero (0°). The expression of substantially zero means an angle in the range of 0° to 1° (preferably 0.5° or smaller, more preferably 0.3° or smaller). The pre-tilt angle can be measured by a polarimeter (product name: OPTIPRO) from Shintech, Inc.

The specific material of the photo-alignment films 11 and 31 is not particularly limited, but is suitably a polymer containing a photo-functional group (hereinafter, also referred to as a photo-reactive polymer). Such a material contributes to easy formation of the photo-alignment films 11 and 31.

A photo-functional group is a functional group which, when irradiated with light (preferably ultraviolet light, more preferably polarized ultraviolet light), provides a feature of controlling the alignment of liquid crystal molecules in the liquid crystal layer 40 to the photo-alignment films 11 and 31. The photo-functional group is not particularly limited, but is preferably a group that undergoes at least one reaction selected from the group consisting of photo-isomerization, photo-dimerization, photo-cross-linking, photo-decomposition, and photo-Fries rearrangement reactions. Use of such a photo-functional group enables easy setting of the pre-tilt angle of the liquid crystal layer 40 to substantially zero.

In the case that the photo-functional group undergoes a photo-isomerization reaction, the photo-functional group is isomerized by photo-irradiation. For example, when the photo-functional group is irradiated with light, a cis-isomer (or trans-isomer) is excited and isomerized to the trans-isomer (or the cis-isomer).

In the case that the photo-functional group undergoes a photo-dimerization reaction, the photo-functional groups of the respective polymers form dimers when irradiated with light. The polymers are linked by the dimers, forming a cross-linking structure.

In the case that the photo-functional group undergoes a photo-cross-linking reaction, polymers are linked to each other by structures derived from the photo-functional group when irradiated with light, forming a cross-linking structure.

In the case that the photo-functional group undergoes a photo-decomposition reaction, the photo-functional group is decomposed when irradiated with light.

In the case that the photo-functional group undergoes a photo-Fries rearrangement reaction, a part of the photo-functional group is rearranged when irradiated with light, forming an aromatic hydroxyketone skeleton.

Suitable examples of the photo-functional group are functional groups with a skeleton such as a cinnamate skeleton, chalcone skeleton, azobenzene skeleton, stilbene skeleton, coumarin skeleton, phenyl ester skeleton, or cyclobutane skeleton. Use of such a functional group enables easy setting of the pre-tilt angle of the liquid crystal layer 40 to substantially zero.

The cinnamate skeleton and the chalcone skeleton can cause a photo-dimerization reaction and/or a photo-cross-linking reaction. The azobenzene skeleton and the stilbene skeleton can cause a photo-isomerization reaction. The cyclobutane skeleton can cause a photo-decomposition reaction. The phenyl ester skeleton can cause a photo-Fries rearrangement reaction.

Examples of the photo-reactive polymer include polymers such as vinyl polymers, acrylic polymers, polyimide, polyamic acid, polysiloxane, polymaleimide, polyesters, and polyamides. These polymers can contribute to easy formation of the photo-alignment films 11 and 31.

The inventors of the present invention have also found that polyamic acid and polyimide obtained by reacting m-tolidine (2,2'-dimethylbiphenyl-4,4'-diamine) represented by the following formula (1) have a favorable ion adsorption function.

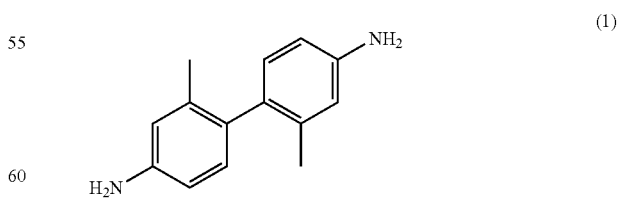

(1)

The polyamic acid and/or polyimide, when added to an alignment agent, can trap impurity ions present in the liquid crystal, reducing a drop of the applied voltage due to movement of impurity ions involved in inversion of the electric field vectors. From such a viewpoint, the photo-alignment films 11 and 31 each preferably contain at least one of polyamic acid and polyimide obtained by reacting m-tolidine with an acid dianhydride (hereinafter, such a polymer is also referred to as an ion-adsorption polymer). The polyimide may also be obtained by fully or partially imidizing polyamic acid obtained through a reaction of m-tolidine and an acid dianhydride.

The amount of the ion-adsorption polymer in each of the photo-alignment films 11 and 13 is not particularly limited. Still, the ratio by weight of the photo-reactive polymer to the ion-adsorption polymer (photo-reactive polymer:ion-adsorption polymer) is preferably 1:99 to 80:20, more preferably 5:95 to 50:50, still more preferably 10:90 to 30:70.

The acid dianhydride may be any acid dianhydride reactive with m-tolidine. Suitable examples thereof include an acid dianhydride (PMDA) represented by the following formula (2-1), an acid dianhydride (CBDA) represented by the following formula (2-2), an acid dianhydride (BPDA) represented by the following formula (2-3), an acid dianhydride (exoHDA) represented by the following formula (2-4), an acid dianhydride (BTDA) represented by the following formula (2-5), an acid dianhydride (TCA) represented by the following formula (2-6), and an acid dianhydride (NDA) represented by the following formula (2-7). Use of any of these acid dianhydrides can lead to favorable electric characteristics of the photo-alignment films 11 and 31. These acid dianhydrides may be used alone or in combination.

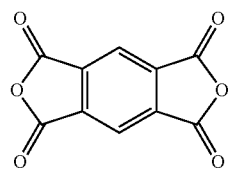

(2-1)

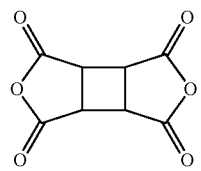

(2-2)

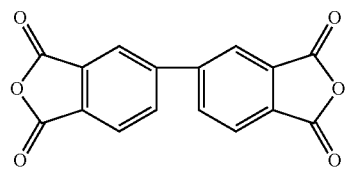

(2-3)

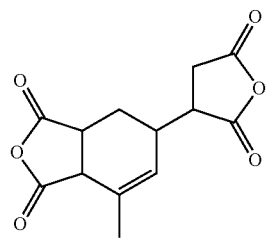

(2-4)

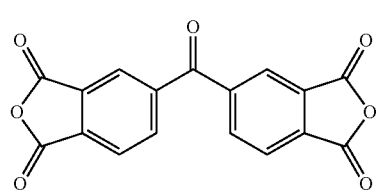

(2-5)

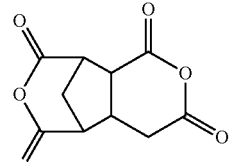

(2-6)

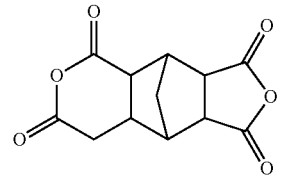

(2-7)

In particular, CBDA (1,2,3,4-cyclobutanetetracarboxylic dianhydride) represented by the above formula (2-2) is preferred. This acid dianhydride can give particularly favorable electric characteristics to the photo-alignment films 11 and 31.

The liquid crystal layer 40 is formed by sealing a liquid crystal material (composition containing liquid crystal components) in the space between the substrates 10 and 30 surrounded by the sealant 4. The liquid crystal layer 40 is a layer exhibiting a nematic phase, and contains at least liquid crystal molecules with a bicyclohexyl skeleton and liquid crystal molecules with a difluorobenzene skeleton. The liquid crystal molecules in the liquid crystal layer 40 are in a parallel alignment (horizontal alignment, homeotropical alignment) under the alignment control force of the photo-alignment films 11 and 31 with no voltage applied, meaning that the major axes of the molecules are aligned to be substantially parallel to the surfaces of the substrates 10 and 30.

As described above, the key factor to set the VHR is impurity ions contained in the liquid crystal. Liquid crystal containing liquid crystal molecules with high mesogen polarization tends to take in impurity ions. It is therefore important to minimize the number of such liquid crystal molecules and use liquid crystal molecules with low polarizability. The inventors of the present invention have found that since the polarizability of a bicyclohexyl skeleton represented by the following formula (3) is low and liquid crystal molecules with the bicyclohexyl skeleton do not much interact with impurity ions, this skeleton is effective in reduction of the density of impurity ions in the liquid crystal. This is presumably because they reduce elution of impurity ions to the liquid crystal layer.

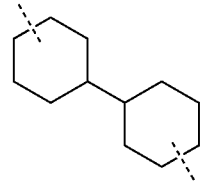

(3)

The liquid crystal layer 40 of the present embodiment therefore contains liquid crystal molecules with the bicyclohexyl skeleton. The present embodiment therefore enables reduction of elution of impurity ions to the liquid crystal layer 40, and thus enables reduction of a decrease in VHR due to impurity ions.

In portions other than the bicyclohexyl skeleton, the liquid crystal molecules with the bicyclohexyl skeleton may have any structure. Examples of the liquid crystal molecules include those represented by the following formula (4-1), and those represented by the following formulas (4-2), (4-3), (4-4), (4-5), or (4-6) in Non-Patent Literature 1.

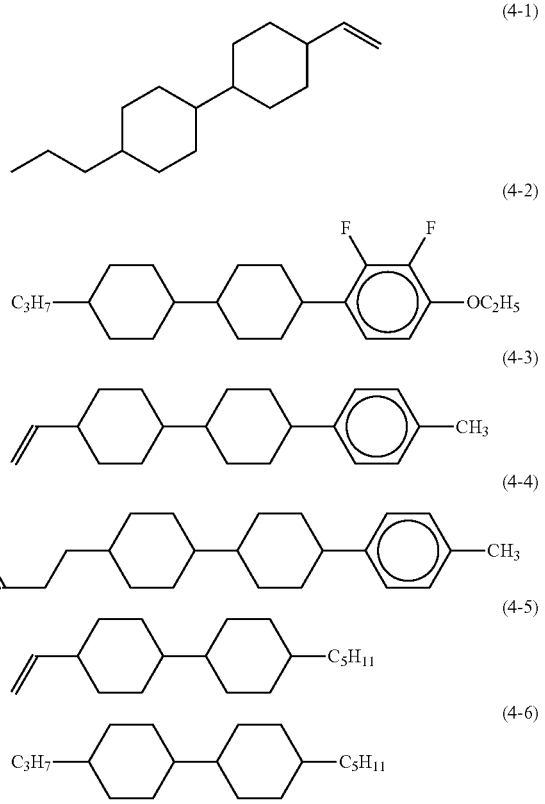

The liquid crystal layer 40 may contain the liquid crystal molecules with the bicyclohexyl skeleton in any amount. Yet, the liquid crystal material as a whole contains the liquid crystal molecules with the bicyclohexyl skeleton in an amount of preferably 5 to 70 wt %, more preferably 10 to 60 wt %, still more preferably 15 to 50 wt %.

The anisotropy of dielectric constant (Δs) of the liquid crystal layer 40 is negative, not positive. In the transverse electric field mode, the transverse electric fields usually contain some components (perpendicular components) that are perpendicular to the surfaces of the substrates 10 and 30 as well as parallel components. Hence, in the case that the anisotropy of dielectric constant of the liquid crystal layer 40 is positive, the liquid crystal molecules are aligned along the lines of electric force with voltage applied (when driven), which means that the molecules arise from the substrate 10 to cause a change in the liquid crystal alignment. This alignment change can be a cause of flexo-polarization. In contrast, since the anisotropy of dielectric constant of the liquid crystal layer 40 is negative in the present embodiment, the liquid crystal molecules are aligned perpendicularly to the lines of electric force with voltage applied (when drive), which means that the liquid crystal molecules can be aligned in a plane parallel to the substrate 10, resulting in reduction of flexo-polarization.

It is therefore important to employ liquid crystal with negative anisotropy of dielectric constant in the present embodiment. In contrast, Patent Literature 1 does not particularly limit the anisotropy of dielectric constant of the liquid crystal in the liquid crystal display device to be positive or negative, not giving importance to the anisotropy of dielectric constant.

The specific value of the anisotropy of dielectric constant of the liquid crystal layer 40 is not particularly limited, but is preferably −1 to −12, more preferably −2 to −10, still more preferably −3 to −8, at 20° C. and 1 kHz. With highly negative anisotropy of dielectric constant, the threshold voltage Vth can be reduced and thus the power consumption can be reduced, though the liquid crystal reliability tends to decrease. With a value of the anisotropy of dielectric constant within the above numerical range, the reliability and the threshold voltage can be balanced.

As described above, the liquid crystal layer 40 contains liquid crystal molecules with the bicyclohexyl skeleton and has negative anisotropy of dielectric constant. Yet, it is difficult to effectively provide negative anisotropy of dielectric constant to the liquid crystal layer 40 with the liquid crystal molecules with the bicyclohexyl skeleton alone, and the liquid crystal molecules with the bicyclohexyl skeleton may unfortunately be used in a limited amount. In order to solve this problem, the liquid crystal layer 40 contains liquid crystal molecules with a difluorobenzene skeleton as well.

Structures represented by the following formula (5) (wherein X and Y each represent a halogen element) typically exhibit very high negative anisotropy of dielectric constant. Among these structures having negative anisotropy of dielectric constant, a structure represented by the following formula (5-1), i.e., a difluorobenzene skeleton, is particularly preferred. This skeleton is assumed to have high chemical stability against heat, moisture, and light stresses, exhibit a great effect on reduction of a decrease in VHR, and highly contribute to reduction of flicker.

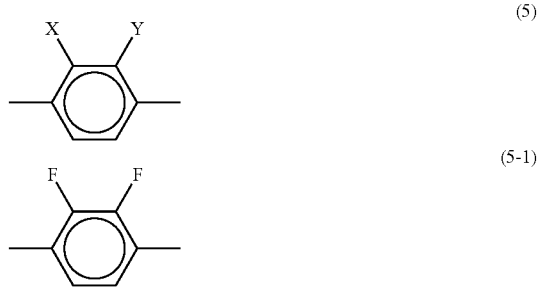

In the case that the liquid crystal layer 40 contains liquid crystal molecules with the difluorobenzene skeleton, the high reliability and highly negative anisotropy of dielectric constant of the liquid crystal molecules allow introduction of many liquid crystal molecules with the bicyclohexyl skeleton to the liquid crystal layer 40. These liquid crystal molecules provide a synergistic effect, and therefore can effectively reduce flicker.

In portions other than the structure represented by the above formula (5-1), the liquid crystal molecules having the structure represented by the above formula (5) may have any structure. Suitable examples of the liquid crystal molecules include those represented by the following formula (6-1) and those represented by the following formula (6-2) disclosed in Non-Patent Literature 1. In the following formula (6-1), $R^2$ represents a C1-C7 linear alkyl group, and $R^2$ represents a C1-C5 linear alkyl group or a C1-C4 linear alkoxyl group.

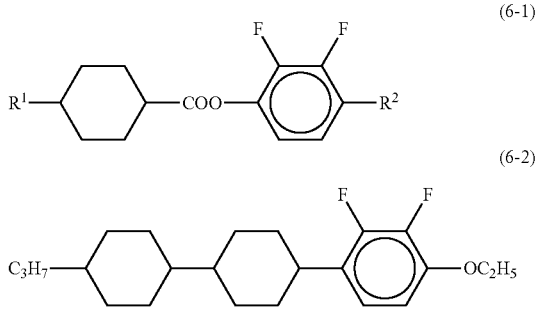

(6-1)

(6-2)

The liquid crystal layer 40 may contain the liquid crystal molecules with the difluorobenzene skeleton in any amount. Yet, the liquid crystal material as a whole contains the liquid crystal molecules with the difluorobenzene skeleton in an amount of preferably 1 to 70 wt %, more preferably 2 to 60 wt %, still more preferably 3 to 50 wt %.

The structure represented by the above formula (5) can also be a structure represented by the following formula (5-2). However, reduction of a decrease in VHR by this structure is insufficient, which may result in flicker perception.

(5-2)

Examples of the liquid crystal molecules represented by the above formula (5-2) include liquid crystal molecules represented by the following formula (7). In the following formula (7), $R^1$ represents a C1-C7 linear alkyl group, and $R^2$ represents a C1-C5 linear alkyl group or a C1-C4 linear alkoxyl group.

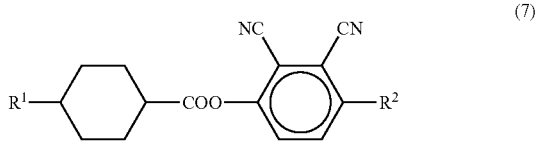

(7)

The liquid crystal layer 40 may also contain a component other than the liquid crystal molecules with the bicyclohexyl skeleton and the liquid crystal molecules with the difluorobenzene skeleton, such as a typical liquid crystal material with negative anisotropy of dielectric constant.

The liquid crystal layer 40 is preferably formed by sealing, between the substrates 10 and 30, a liquid crystal material containing liquid crystal molecules with the bicyclohexyl skeleton and liquid crystal molecules with the difluorobenzene skeleton without any polymerizable monomers (e.g., monomers generating radicals and being polymerized when irradiated with light such as ultraviolet light). Such a liquid crystal layer can prevent generation of impurity ions from the polymerizable monomers, and can effectively reduce generation of flicker compared to the case of containing polymerizable monomers.

The liquid crystal layer 40 may be formed by sealing, between the substrates 10 and 30, a liquid crystal material containing liquid crystal molecules with the bicyclohexyl skeleton, liquid crystal molecules with the difluorobenzene skeleton, and a polymerizable monomer (e.g., monomer generating radicals and being polymerized when irradiated with light such as ultraviolet light), and then irradiating the liquid crystal material with light (for example, ultraviolet light). In this case, the concentration of the polymerizable monomer is preferably set low. In particular, the liquid crystal material as a whole before the irradiation with light preferably contains a polymerizable monomer at a concentration of lower than 0.4% by mass, more preferably 0.3% by mass or lower, still more preferably 0.1% by mass or lower. A concentration of 0.4% by mass or higher may increase the impurity monomers from the polymerizable monomer, decreasing VHR. A concentration of 0.1% by mass or lower may be able to provide VHR of the same level as the case of employing a liquid crystal material without polymerizable monomers, and can lessen the chance of flicker perception to the same level. In the case that the liquid crystal material contains a polymerizable monomer, the lower limit of the concentration of the polymerizable monomer is not particularly limited as long as the liquid crystal material as a whole contains the polymerizable monomer at a concentration of higher than 0% by mass before the irradiation with light.

The polymerizable monomer may be polymerized into a polymer when irradiated with light. Also, polymers of the polymerizable monomer may be present on the photo-alignment films 11 and 31 and/or in the liquid crystal layer 40.

Examples of the polymerizable monomer include monomers with monofunctional or polyfunctional polymerizable groups containing at least one kind of ring structure. Examples of such monomers include those represented by the following formula (8).

$$P^1-S_p^1-R^2-A^1-(Z-A^2)_n-R^1 \qquad (8)$$

In the formula, $R^1$ represents a $-R^2$-$Sp^1$-$P^1$ group, hydrogen atom, halogen atom, —CN, —NO$_2$, —NCO, —NCS, —OCN, —SCN, —SF$_5$, or C1-C12 linear or branched alkyl group;

$P^1$ represents a polymerizable group;

$Sp^1$ represents a C1-C6 linear, branched, or cyclic alkylene or alkyleneoxy group, or a direct bond;

a hydrogen atom in $R^1$ may be substituted with a fluorine atom or chlorine atom;

a —CH$_2$— group in $R^1$ may be substituted with a —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, or —OCO—CH═CH— group, unless an oxygen atom and a sulfur atom are positioned adjacent to each other;

$R^2$ represents a —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, or —OCO—CH═CH— group, or direct bond;

$A^1$ and $A^2$ are the same as or different from each other, and each represent a 1,2-phenylene, 1,3-phenylene, 1,4-phenylene, naphthalene-1,4-diyl, naphthalene-1,5-diyl, naphthalene-2,6-diyl, 1,4-cyclohexylene, 1,4-cyclohexenylene, 1,4-bicyclo[2.2.2]octylene, piperidine-1,4-diyl, naphthalene-2,6-diyl, decahydronaphthalene-2,6-diyl, 1,2,3,4-tetrahydronaphthalene-2,6-diyl, indane-1,3-diyl, indane-1,5-diyl, indane-2,5-diyl, phenanthrene-1,6-diyl, phenanthrene-1,8-diyl, phenanthrene-2,7-diyl, phenanthrene-3,6-diyl, anthracene-1,5-diyl, anthracene-1,8-diyl, anthracene-2,6-diyl, or anthracene-2,7-diyl group;

—CH$_2$— groups in A$^1$ and A$^2$ may each be substituted with a —O— or —S— group unless they are positioned adjacent to each other;

a hydrogen atom in each of A$^1$ and A$^2$ may be substituted with a fluorine atom, chlorine atom, —CN group, or a C1-C6 alkyl, alkoxy, alkylcarbonyl, alkoxycarbonyl, or alkylcarbonyloxy group;

Z's are the same as or different from each other, and each represent a —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, or —OCO—CH═CH— group, or direct bond; and n represents 0, 1, or 2.

Specific examples of the monomers include compounds represented by any of the following formulas (9-1) to (9-5).

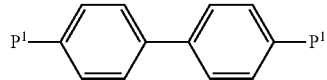
(9-1)

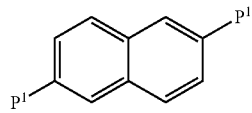
(9-2)

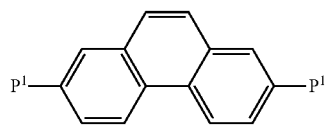
(9-3)

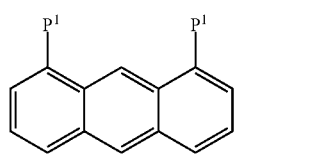
(9-4)

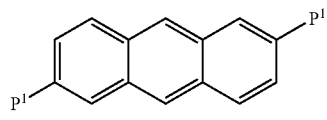
(9-5)

In the formulas, P$^1$'s are the same as or different from each other, and each represent a polymerizable group; any or all of the hydrogen atoms in the benzene rings may each be substituted with a halogen atom or a C1-C12 alkyl or alkoxy group; and any or all of the hydrogen atoms in the C1-C12 alkyl or alkoxy groups may each be substituted with a halogen atom.

Examples of P$^1$ include acryloyloxy, methacryloyloxy, vinyl, vinyloxy, acryloylamino, and methacryloylamino groups.

Examples of the other polymerizable monomers usable in the present embodiment include compounds represented by any of the following formulas (10-1) to (10-8).

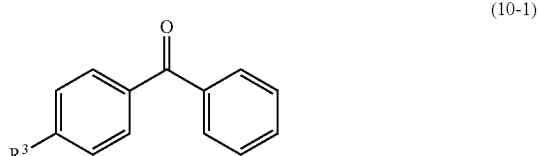
(10-1)

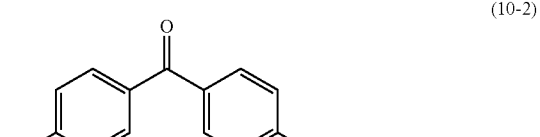
(10-2)

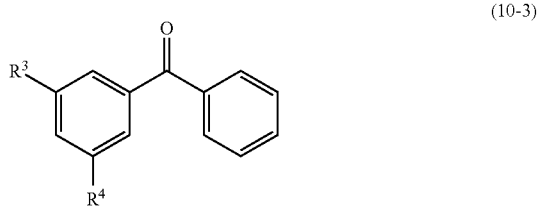
(10-3)

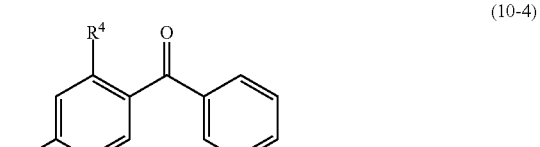
(10-4)

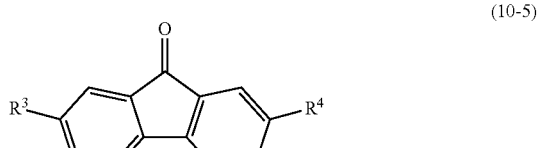
(10-5)

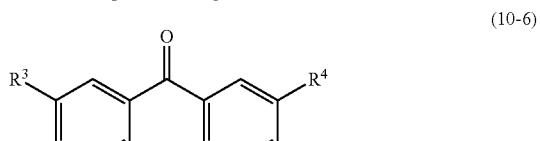
(10-6)

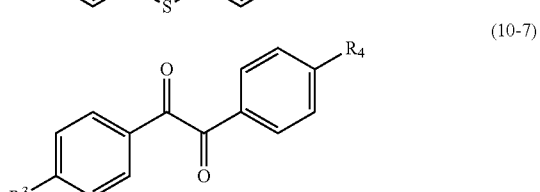
(10-7)

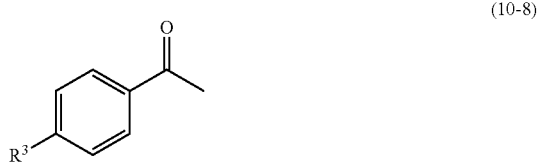
(10-8)

In the formulas,

R$^3$ and R$^4$ are the same as or different from each other, and each represent a -Sp$^2$-P$^2$ group, hydrogen atom, halogen atom, —CN, —NO$_2$, —NCO, —NCS, —OCN, —SCN, —SF$_5$, or C1-C12 linear or branched alkyl, aralkyl, or phenyl group;

at least one of $R^3$ and $R^4$ contains a -$Sp^2$-$P^2$ group;

$P^2$ represents a polymerizable group;

$Sp^2$ represents a C1-C6 linear, branched, or cyclic alkylene or alkyleneoxy group, or direct bond;

in the case that at least one of $R^3$ and $R^4$ is a C1-C12 linear or branched alkyl, aralkyl, or phenyl group, hydrogen atoms in at least one of $R^3$ and $R^4$ may each be substituted with a fluorine atom, chlorine atom, or -$Sp^2$-$P^2$ group;

a —$CH_2$— group in each of $R^1$ and $R^2$ may be substituted with a —O—, —S—, —NH—, —CO—, —COO—, —OCO—, —O—COO—, —$OCH_2$—, —$CH_2O$—, —$SCH_2$—, —$CH_2S$—, —$N(CH_3)$—, —$N(C_2H_5)$—, —$N(C_3H_7)$—, —$N(C_4H_9)$—, —$CF_2O$—, —$OCF_2$—, —$CF_2S$—, —$SCF_2$—, —$N(CF_3)$—, —$CH_2CH_2$—, —$CF_2CH_2$—, —$CH_2CF_2$—, —$CF_2CF_2$—, —CH=CH—, —CF=CF—, —C≡C—, —CH=CH—COO—, or —OCO—CH=CH— group, unless an oxygen atom, a sulfur atom, and a nitrogen atom are positioned adjacent to each other;

any or all of the hydrogen atoms in the benzene rings may each be substituted with a halogen atom or a C1-C12 alkyl or alkoxy group; and any or all of the hydrogen atoms in the C1-C12 alkyl or alkoxy group may each be substituted with a halogen atom.

Examples of $P^2$ include acryloyloxy, methacryloyloxy, vinyl, vinyloxy, acryloylamino, and methacryloylamino groups.

The sealant 4 plays a key role in prevention of entry of moisture in the air into the liquid crystal layer 40. As the width W of the sealant 4 increases, the probability of moisture entry to the liquid crystal layer 40 decreases. The moisture having entered the liquid crystal layer 40 carries ions, thus decreasing VHR at the edges of the liquid crystal layer 40. More specifically, the width W of the sealant 4 (the length of the sealant 4 in the direction perpendicular to the longitudinal direction of the sealant 4) is preferably greater than 0.1 mm, more preferably 0.2 mm or greater. A width greater than 0.1 mm can effectively reduce flicker due to a decrease in VHR. Too narrow a width W of the sealant 4 may fail to achieve uniform display qualities of the product level. This is presumably because moisture in the air tends to enter the liquid crystal layer 40 to decrease VHR around the sealant 4.

Meanwhile, Patent Literature 1 does not contain any statements about the width of the sealant.

The upper limit of the width W of the sealant 4 is not particularly limited, but is preferably 5 mm or smaller, more preferably 3 mm or smaller, still more preferably 1 mm or smaller. For improvement of the design and functionality (e.g., information amount, portability) of liquid crystal display devices for products such as smartphones, tablets, and TVs, the area ratio of the display region to the entire liquid crystal display device has been increased. Here, in the case that the sealant width W is very wide, the area ratio of the display region 2 to the liquid crystal display device 1 is low. The sealant width W is therefore preferably as narrow as not degrading the design and functionality. Also, the sealant 4 may be any typical sealant for liquid crystal cells, such as an ultraviolet-curable resin.

Figure 9:
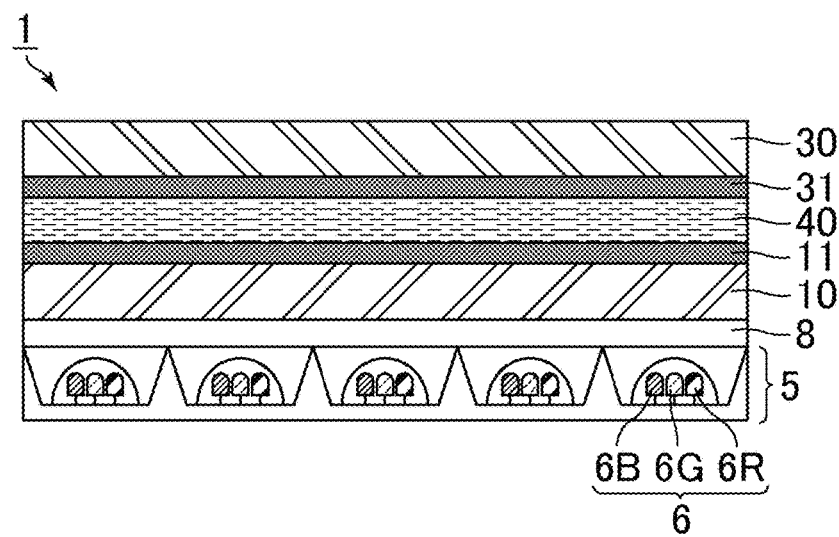
FIG. 9 is a schematic cross-sectional view of a backlight of the liquid crystal display device of Embodiment 1.
Figure 10:
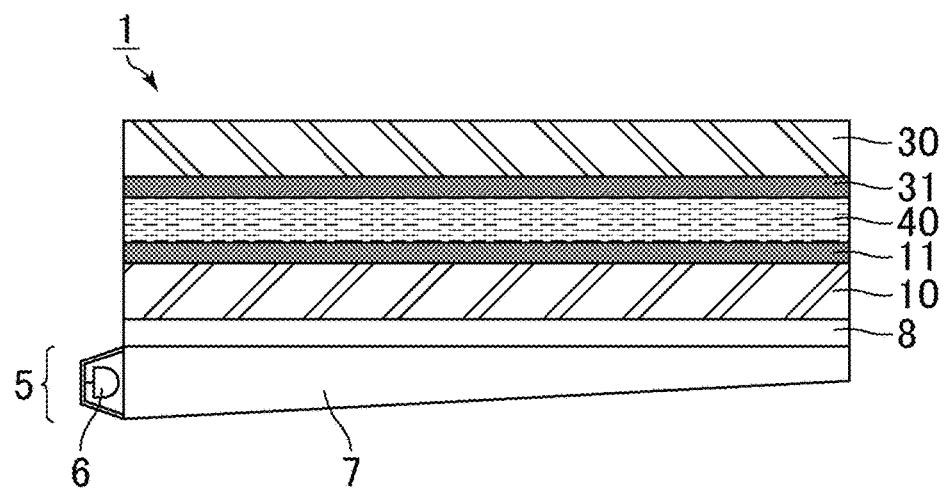
FIG. 10 is a schematic cross-sectional view of a backlight of the liquid crystal display device of Embodiment 1.

FIGS. 9 and 10 each are a schematic cross-sectional view of a backlight of the liquid crystal display device of Embodiment 1.

The backlight 5 is a surface light source disposed behind the substrate 10 and emits light to the substrate 10. As illustrated in FIGS. 9 and 10, the backlight 5 preferably includes LEDs 6 as the light source.

The backlight 5 may include a cold cathode fluorescent lamp (CCFL) as a light source. CCFL, however, emits ultraviolet light having wavelengths of 313 nm and 365 nm, for example, damaging the liquid crystal. In particular, the liquid crystal molecules decompose to generate impurity ions.

In contrast, the LEDs 6 do not emit ultraviolet light having a wavelength of 313 nm, and use of the LEDs 6 as the light source can reduce the damage on the liquid crystal, reducing generation of impurity ions. From such a viewpoint, the LEDs 6 are preferably ones emitting only visible light without emitting ultraviolet light, more preferably ones having an emission wavelength of 380 nm or longer, still more preferably ones emitting substantially no light having a wavelength of shorter than 380 nm. Also, the LEDs 6 are preferably based on a luminescence principle utilizing electroluminescence. The LEDs 6 may also be organic light emitting diodes (OLEDs). The LEDs 6 may be white LEDs, or may be, as illustrated in FIG. 9, LEDs 6R, 6G, and 6B emitting the respective three colors of red, green, and blue. Such LEDs 6 can be the same LEDs as those included in the backlight of a typical liquid crystal panel.

The backlight 5 may be a direct backlight with the LEDs 6 arranged in a matrix form as illustrated in FIG. 9, or may be a sidelight backlight with the LEDs 6 disposed linearly to face the edge surface of a light guide plate 7 as illustrated in FIG. 10. In either case, a diffusing sheet 8 that diffuses light from the LEDs 6 may be disposed between the backlight 5 and the substrate 10 (more specifically, the polarizer disposed on the surface of the substrate 10 on the side opposite to the liquid crystal layer 40).

The backlight 5 preferably has variable luminance. The backlight 5 employing the LEDs 6 can emit only visible light. Yet, the aging process, which performs exposure under visible light for a long period of time, slightly influences the photo-alignment films 11 and 31 and/or the liquid crystal, resulting in an increase in the chance of flicker perception. For reduction of the irradiation dose of visible light with which the liquid crystal layer 40 is irradiated, the luminance of the backlight 5 is preferably changed with time. For example, it is preferred to control the luminance of the backlight 5 depending on the brightness of the surrounding environment, or employ the field sequential method.

In contrast, Patent Literature 1 does not contain any statements about a backlight.

As described above, the liquid crystal display device 1 of the present embodiment is a liquid crystal display device in the transverse electric field mode. The liquid crystal display device 1 includes the paired substrates 10 and 30, the photo-alignment films 11 and 31 disposed on at least one of the paired substrates 10 and 30, the horizontal alignment liquid crystal layer 40 disposed between the paired substrates 10 and 30, and the pixels 3 arranged in a matrix form, the liquid crystal layer 40 containing the liquid crystal molecules with the bicyclohexyl skeleton and the liquid crystal molecules with the difluorobenzene skeleton, the liquid crystal layer 40 having negative anisotropy of dielectric constant, one of the substrates 10 and 30 including the TFTs 24 disposed in the respective pixels 3, the TFTs 24 each including the semiconductor layer 26 that contains an oxide semiconductor, the liquid crystal display device 1 having a frame rate of lower than 50 Hz.

The transverse electric field mode can form larger parallel capacitance than the vertical electric field driving. The present embodiment employing a transverse electric field mode can therefore reduce a decrease in VHR and can lead to a lesser chance of flicker perception.

Also, provision of the photo-alignment films 11 and 31 disposed on at least one of the paired substrates 10 and 30 enables irradiation with light, which is a non-contact treatment, as the alignment treatment. Hence, use of the photo-alignment films 11 and 31 here lessens the chance of surface staining of the photo-alignment films 11 and 31, thereby reducing a decrease in VHR due to the impurities. Also, the pre-tilt angle in the horizontal alignment liquid crystal layer 40 can be made substantially zero, so that the degree of symmetry of the liquid crystal alignment can be increased. Accordingly, the photo-alignment films can reduce flexo-polarization and reduce flicker perception.

Also, the liquid crystal layer 40 containing the liquid crystal molecules with the bicyclohexyl skeleton can reduce the solubility of impurity ions in the liquid crystal layer 40. The present embodiment therefore can reduce a decrease in VHR due to impurity ions and thereby reduce flicker.

Since the anisotropy of dielectric constant of the liquid crystal layer 40 is negative, the liquid crystal molecules with voltage applied are aligned in the direction perpendicular to the lines of electric force. This means that the liquid crystal molecules can be aligned in a plane parallel to each of the substrates 10 and 30, so that the present embodiment can reduce the chance of flexo-polarization generation and reduce flicker perception.

In the case that the liquid crystal layer 40 contains the liquid crystal molecules with the difluorobenzene skeleton, the high reliability and highly negative anisotropy of dielectric constant of the liquid crystal molecules allow introduction of many liquid crystal molecules with the bicyclohexyl skeleton to the liquid crystal layer 40. These liquid crystal molecules provide a synergistic effect, and therefore can effectively decrease the solubility of impurity ions into the liquid crystal layer 40, effectively reducing flicker.

Furthermore, the off-leakage current of each TFT 24 including the semiconductor layer 26 containing an oxide semiconductor can be made low. Hence, a drop of the applied voltage can be reduced even with a low frame rate of the liquid crystal display device 1, VHR can be increased, and thus flicker can be reduced.

In the case of decreasing the frame rate of the liquid crystal display device 1 to a value lower than 50 Hz, the power consumption of the liquid crystal display device 1 can be reduced. In the case of driving the liquid crystal display device 1 at a low frequency, flicker tends to occur. The present embodiment, however, provides various measures to take as described above, and therefore can reduce flicker.

As described above, the present embodiment can prevent flicker and reduce the power consumption.

The liquid crystal display device 1 of the present embodiment preferably further includes the backlight 5 including the LEDs 6. The liquid crystal display device 1 therefore can reduce damage on the liquid crystal, preventing generation of impurity ions due to the liquid crystal molecules. Accordingly, flicker can be effectively prevented.

The backlight 5 preferably has variable luminance. Thereby, the backlight 5 has a smaller damage on the liquid crystal, more effectively reducing generation of impurity ions due to the liquid crystal molecules. Thus, flicker can be effectively prevented.

The liquid crystal layer 40 is preferably formed by sealing, between the paired substrates 10 and 30, a liquid crystal material containing the liquid crystal molecules with the bicyclohexyl skeleton and the liquid crystal molecules with the difluorobenzene skeleton. The liquid crystal material preferably does not contain any polymerizable monomers. Thereby, generation of impurity monomers due to polymerizable monomers can be prevented, and flicker can be effectively reduced.

In contrast, the liquid crystal layer 40 may be formed by irradiation of the liquid crystal material sealed between the paired substrates 10 and 30 with light. The liquid crystal material may contain the liquid crystal molecules with the bicyclohexyl skeleton, the liquid crystal molecules with the difluorobenzene skeleton, and a polymerizable monomer. The liquid crystal material as a whole may contain the polymerizable monomer at a concentration of lower than 0.4% by mass before the irradiation with light. Thereby, generation of impurity monomers due to the polymerizable monomers can be prevented, and thus flicker can be effectively reduced.

The liquid crystal display device 1 of the present embodiment preferably further includes the sealant 4 disposed between the paired substrates 10 and 30 and surrounding the liquid crystal layer 40. The sealant 4 preferably has a width of greater than 0.1 mm. Thereby, the probability of moisture entry to the liquid crystal layer 40 can be decreased, so that generation of impurity monomers due to moisture can be prevented, and thus flicker can be effectively prevented.

The photo-alignment films 11 and 31 each preferably contain at least one of polyamic acid and polyimide which are obtained by a reaction of m-tolidine and an acid dianhydride. The polyamic acid and/or polyimide can trap impurity ions present in the liquid crystal, reducing a drop of the applied voltage due to movement of impurity ions involved in inversion of the electric field vectors. Therefore, flicker can be effectively prevented.

The acid dianhydride is preferably 1,2,3,4-cyclobutanetetracarboxylic dianhydride. This acid dianhydride can give particularly favorable electric characteristics to the photo-alignment films 11 and 31.

The pre-tilt angle in the liquid crystal layer 40 is preferably substantially zero. Such a pre-tilt angle can increase the degree of symmetry of the liquid crystal alignment, effectively reducing flexo-polarization. Thereby, flicker can be effectively prevented.

The photo-alignment films 11 and 31 each are preferably formed from a polymer containing a photo-functional group. Such a polymer leads to easy formation of the photo-alignment films 11 and 31.

The photo-functional group preferably undergoes at least one reaction selected from the group consisting of photo-isomerization, photo-dimerization, photo-cross-linking, photo-decomposition, and photo-Fries rearrangement reactions. Such a photo-functional group can contribute to easy achievement of a pre-tilt angle of the liquid crystal layer 40 of substantially zero.

The polymer preferably contains, as the photo-functional group, at least one skeleton selected from the group consisting of cinnamate, chalcone, azobenzene, stilbene, coumarin, phenyl ester, and cyclobutane skeletons. Such a polymer can lead to easy achievement of a pre-tilt angle of the liquid crystal layer 40 of substantially zero.

The oxide semiconductor is preferably an In—Ga—Zn—O— based oxide semiconductor. Such an oxide semiconductor can particularly effectively lead to a low off-leakage current of the TFT 24.

The transverse electric field mode is preferably the IPS mode. This mode enables effective reduction of the flexo-polarization. This mode can be effective in reducing a drop of the effective voltage applied to the liquid crystal because large parallel capacitance with the insulating substrate as a dielectric is formed. Thereby, flicker can be effectively reduced.

The transverse electric field mode may also be the FFS mode. Since the anisotropy of dielectric constant of the liquid crystal layer 40 in the present embodiment is negative, the liquid crystal molecules can be aligned in a plane parallel to each of the substrates 10 and 30, so that the FFS mode also can reduce the chance of flexo-polarization generation. Also, the FFS mode can be effective in reducing a drop of the effective voltage applied to the liquid crystal because large parallel capacitance with the insulating film 21 as a dielectric is formed. Thereby, flicker can be effectively reduced.

Hereinafter, examples in each of which the liquid crystal display device of Embodiment 1 was actually produced are described together with comparative examples.

Example 1

First, an alignment agent was prepared which contained as its solids content a polymer containing a photo-functional group. This alignment agent was applied to a glass substrate including paired comb electrodes (hereinafter, such a substrate is also referred to as an IPS electrode substrate). The width of each comb tooth was 3 μm. The distance between adjacent comb teeth (the width of each space) was 9 μm. The same alignment agent was applied to a bare glass substrate used as the counter substrate. The alignment agent had a composition (ratio by weight) of NMP:BC:solids content=65:30:5. The polymer containing a photo-functional group was polyamic acid containing a cyclobutane skeleton in its main chain.

Then, the substrates were pre-baked at 70° C. for two minutes. Each pre-baked alignment film had a thickness of 100 nm. The substrates were then post-baked at 230° C. for 30 minutes. Each alignment film was irradiated with polarized ultraviolet light (alignment treatment). The substrates were additionally baked at 230° C. 30 minutes. A sealant (World Rock available from Kyoritsu Chemical & Co., Ltd.) was poured in a certain pattern on the counter substrate, followed by attachment of the counter substrate and the IPS electrode substrate, whereby an empty cell was produced. The empty cell was filled with a liquid crystal material under vacuum, so that an IPS mode liquid crystal cell was produced. The liquid crystal cell was heated at 130° C. for 40 minutes for re-alignment treatment for the liquid crystal. The width of the sealant after the re-alignment treatment was 1 mm. The retardation for the liquid crystal layer (refractive index anisotropy of the liquid crystal×cell thickness) was 330 nm. The pre-tilt angle in the liquid crystal layer was 0°.

The liquid crystal material used was a material prepared by adding trans-4-propyl-4'-vinyl-1,1'-bicyclohexane represented by the above formula (4-1) (corresponding to the liquid crystal molecules with the bicyclohexyl skeleton) to a negative liquid crystal material having negative anisotropy of dielectric constant (MLC-6610 from Merck KGaA) to 20 wt % of the liquid crystal material as a whole, and adding liquid crystal molecules containing a structure represented by the above formula (6-1) (corresponding to the liquid crystal molecules with the difluorobenzene skeleton) to 3 wt % of the liquid crystal material as a whole. The liquid crystal molecules containing a structure represented by the above formula (6-1) used were liquid crystal molecules in which $R^1$ in the above formula (6-1) was a C5 linear alkyl group and $R^2$ was a C4 linear alkoxyl group (liquid crystal molecules disclosed in Patent Literature 2).

To the respective surfaces of the liquid crystal cell were attached polarizers in crossed Nicols. The liquid crystal cell was assembled with a backlight, so that a liquid crystal panel was produced.

The liquid crystal panel was driven under the following conditions as in the TFT drive of an oxide semiconductor. Pulse voltage was applied between the comb electrodes using LC Material Characteristics Measurement System Model 6254 from TOYO Corporation, followed by opening of the comb electrodes. The pulse width was 300 μsec, the applied voltage was 2.5 V, and the holding time was 1 second (i.e., the frame rate was 1 Hz).

The backlight used was one including LEDs (which may be OLEDs) as the light source. The luminescence wavelength of the LEDs was 380 nm or longer. The LEDs were based on the luminescence principle utilizing electroluminescence. The luminance of the backlight was 10000 cd/m².

Hereinafter, the methods for evaluating VHR, contrast, and flicker in the present example are described.

1) VHR (voltage holding ratio)

For measurement of VHR, the LC Material Characteristics Measurement System Model 6254 from TOYO Corporation was used. The pulse width was 300 μsec, the applied voltage was 5 V, the holding time was 1 second, and the measurement temperature was 60° C.

2) Contrast

The contrast was calculated from the formula (contrast)= (luminance in white display)/(luminance in black display). Voltage was applied to achieve the maximum luminance in white display, while voltage was not applied in black display. For measurement of the luminance in each of the white display and the black display, a spectroradiometer (product name: SR-UL2) from Topcon Technohouse Corporation was used.

3) Flicker test

The backlight was turned on with no voltage applied, and the liquid crystal panel was left to stand for three hours at 60° C. and a humidity of 95%. The pulse voltage was applied to the panel using the LC Material Characteristics Measurement System Model 6254 from TOYO Corporation. The pulse width was 300 μsec, the applied voltage was 2.5 V, the drive was polarity-inversion drive (inverting the polarity of voltage for each frame), the holding time was 1 second (1 Hz), and the evaluation temperature was 25° C. The occurrence of flicker was perceived through a neutral density (ND) filter. For the ND filter, three types of filters each with a transmittance of 10%, 20%, or 50% were used. A ND filter with a higher transmittance allows observation closer to that by the naked eye, meaning that flicker is more likely to be perceived. Hence, flicker can be regarded as being more reduced when flicker is not perceived through a ND filter with a higher transmittance.

The evaluation results of the present example are shown below.

1) VHR

The VHR was 98% or higher and was at an acceptable level.

2) Contrast

The contrast was 1000 or higher and was at an acceptable level.

3) Flicker test

Flicker was not perceived through any of the ND filters, and was at an acceptable level.

The liquid crystal panel of the present example had favorable alignment properties and favorable electric characteristics, and achieved favorable display without flicker.

Comparative Example 1-1

A liquid crystal panel of the present comparative example was produced by the same procedure as that in Example 1 except for the following points.

The solids content of the alignment agent was polystyrene. An electrically controlled birefringence (ECB) mode liquid crystal cell was produced using two substrates each including a solid electrode (quadrangular electrode). The alignment treatment performed was rubbing. The liquid crystal material used was a negative liquid crystal material having negative anisotropy of dielectric constant (MLC-6610 from Merck KGaA). The width of the sealant after the re-alignment treatment was 0.1 mm. The backlight used was one including CCFL as the light source.

The evaluation results of the present comparative example determined by the same procedure as that in Example 1 are shown below.
1) VHR
The VHR was 96% or lower and was poorer than that in Example 1.
2) Contrast
The contrast was 1000 or higher and was at the same level as that in Example 1.
3) Flicker test
Flicker was perceived through a ND filter (10% transmittance).

The liquid crystal panel of the present comparative example had poor electric characteristics and resulted in flicker perception, and therefore failed to reach the product level.

In each example and comparative example, a panel on which flicker was perceived through a ND filter (10% transmittance) was judged as one having failed to reach the product level, and a panel on which no flicker was perceived through a ND filter (10% transmittance) was judged as one having reached the product level.

Comparative Example 1-2

A liquid crystal panel of the present comparative example was produced by the same procedure as that in Example 1 except for the following points.

The liquid crystal material used was a material prepared by adding trans-4-propyl-4'-vinyl-1,1'-bicyclohexane represented by the above formula (4-1) to the negative liquid crystal material having negative anisotropy of dielectric constant (MLC-6610 from Merck KGaA) to 20 wt % of the liquid crystal material as a whole and adding liquid crystal molecules containing a structure represented by the above formula (7) to 3 wt % of the liquid crystal material as a whole. The liquid crystal molecules containing a structure represented by the above formula (7) used were liquid crystal molecules in which $R^1$ in the above formula (7) was a C5 linear alkyl group and $R^2$ was a C4 linear alkoxyl group.

The evaluation results of the present comparative example determined by the same procedure as that in Example 1 are shown below.
1) VHR
The VHR was 97% or lower and was poorer than that in Example 1.
2) Contrast
The contrast was 1000 or higher and was at the same level as that in Example 1.
3) Flicker test
Flicker was perceived through a ND filter (10% transmittance).

The liquid crystal panel of the present comparative example had poor electric characteristics and resulted in flicker perception, and therefore failed to reach the product level.

The results of the present comparative example and Example 1 show that use of the liquid crystal molecules with a structure represented by the above formula (5), in particular, a structure represented by the above formula (5-1) (difluorobenzene skeleton), in combination with the liquid crystal molecules with the bicyclohexyl skeleton is effective in reduction of flicker.

Example 1a

A liquid crystal panel of the present example was produced by the same procedure as that in Example 1 except for the following point.

The IPS electrode substrate was changed to a substrate including a planar electrode and electrodes with electrode slits, so that an FFS mode liquid crystal cell was used. In each electrode with electrode slits, the width of each electrode portion along the electrode slits was 3 μm, and the width of each electrode slit was 5 μm. The electrodes held a SiNx film having a thickness of 300 nm in between.

The evaluation results of the present example determined by the same procedure as that in Example 1 are shown below.
1) VHR
The VHR was 99% or higher, and was at the same or higher level than that in Example 1.
2) Contrast
The contrast was 1000 or higher, and was at the same level as that in Example 1.
3) Flicker test
Flicker was not perceived through a ND filter (50% transmittance).

The present example achieved better VHR than Example 1 but led to slightly increased flicker perception. This is presumably because flexo-polarization tends to occur more in the FFS mode than in the IPS mode, and thus the FFS mode liquid crystal panel is susceptible to a luminance change caused by the flexo-polarization. The degrees of influence of luminance changes caused by the flexo-polarization in the respective liquid crystal modes are considered to be in the following relation.

IPS (positive)=IPS (negative)<FFS (negative)<FFS (positive)

That is, the degrees of influence in the positive IPS mode and the negative IPS mode are substantially the same, and the degree of influence increase in the order of the negative IPS mode, the negative FFS mode, and the positive FFS mode.

As described above, the FFS mode display panel of the present example has an asymmetric electrode structure, being susceptible to luminance changes caused by the flexo-polarization. That is, from the viewpoint of flicker prevention, the present example also seems to be disadvantageous. Still, since very large parallel capacitance with the SiNx film as a dielectric is formed between the electrodes in the FFS mode display panel of the present example, a decrease in VHR can be effectively reduced, so that the chance of flicker perception can be lessened.

Here, in the positive mode, the liquid crystal molecules arise from the substrate to cause a change in the liquid crystal alignment, which actually causes the flexo-polarization. Hence, in the IPS mode, the flexo-polarization occurring along the comb electrode structure in one pixel is greater in the positive mode than in the negative mode. However, the IPS mode electrode structure can substantially cancel out the flexo-polarization in the entire pixel. The degrees of susceptibility to luminance changes caused by the flexo-polarization in the positive IPS mode liquid crystal panel and the negative IPS mode liquid crystal panel are substantially the same. The degree of the flexo-polarization in the IPS mode can be expressed as follows.

IPS (positive); −(large flexo-polarization)+(large flexo-polarization)≈0

IPS (negative); −(small flexo-polarization)+(small flexo-polarization)≈0

Comparative Example 1a

A liquid crystal panel of the present comparative example was produced by the same procedure as that in Example 1a except for the following points.

The liquid crystal material used was a positive liquid crystal material having positive anisotropy of dielectric constant (MLC-3019 from Merck KGaA).

The evaluation results of the present example determined by the same procedure as that in Example 1 are shown below.

1) VHR
The VHR was 98% or higher, and was at the same level as that in Example 1.

2) Contrast
The contrast was 1000 or higher, and was at the same level as that in Example 1.

3) Flicker test
Flicker was perceived through a ND filter (10% transmittance).

The liquid crystal panel of the present comparative example resulted in flicker perception, and thus failed to reach the product level. The cause of the failure is described with reference to FIGS. 11 and 12.

Figure 11:
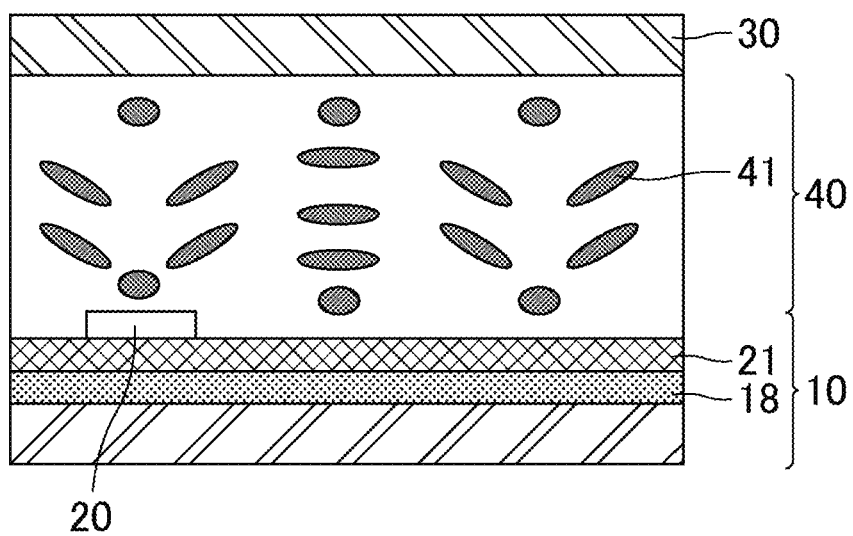
FIG. 11 is a schematic cross-sectional view of a liquid crystal panel of Comparative Example 1a, illustrating a cross section perpendicular to an electrode slit.
Figure 12:
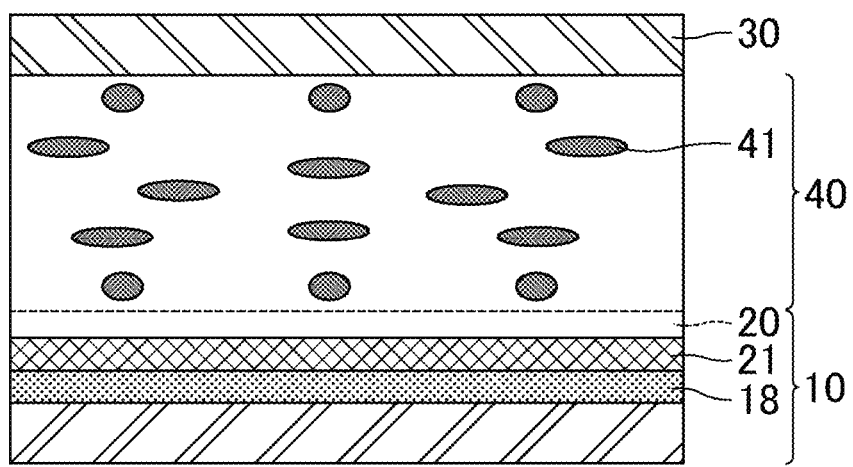
FIG. 12 is another schematic cross-sectional view of the liquid crystal panel of Example 1a, illustrating a cross section parallel to an electrode slit (surface cut on the electrode slit).
Figure 13:
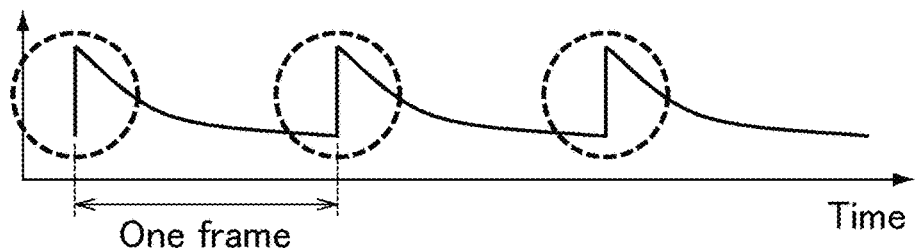
FIG. 13 is a graph showing changes relative to time in the luminance of a liquid crystal display device, showing the luminance changes caused by impurity ions and off-leakage current of a TFT.
Figure 14:
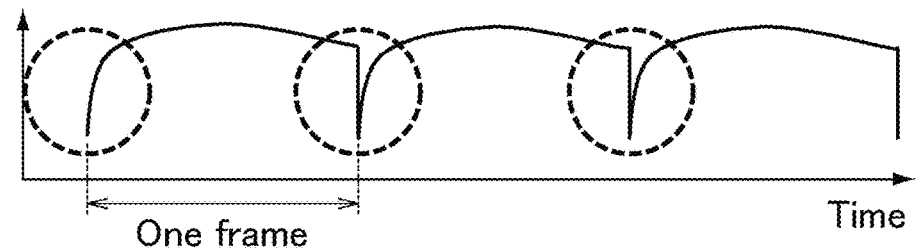
FIG. 14 is a graph showing changes relative to time in the luminance of a liquid crystal display device, showing the luminance changes caused by flexo-polarization.

FIG. 11 is a schematic cross-sectional view of a liquid crystal panel of Comparative Example 1a, illustrating a cross section perpendicular to an electrode slit. FIG. 12 is another schematic cross-sectional view of the liquid crystal panel of Example 1a, illustrating a cross section parallel to an electrode slit (surface cut on the electrode slit). FIG. 12 illustrates the positions of the electrodes with electrode slits by a dashed line, though the electrodes are actually not visible.

As illustrated in FIG. 11, in the present comparative example in which the anisotropy of dielectric constant of the liquid crystal was positive, flicker was perceived presumably because some of the liquid crystal molecules 41 with voltage applied were aligned to arise from the substrate 10, causing flexo-polarization. In contrast, as illustrated in FIG. 12, in Example 1a in which the anisotropy of dielectric constant of the liquid crystal was negative, flexo-polarization was smaller than that in the present comparative example presumably because the liquid crystal molecules 41 with voltage applied were aligned in the direction perpendicular to the lines of electric force, and thus the liquid crystal molecules 41 were aligned in a plane parallel to the substrate 10. The results of the present comparative example and Example 1a show that in the transverse electric field modes, particularly in the FFS mode, liquid crystal having negative anisotropy of dielectric constant is preferred.

Example 1b-1

A liquid crystal panel of the present example was produced by the same procedure as that in Example 1 except for the following point.

The liquid crystal cell was irradiated with non-polarized ultraviolet light with an irradiation dose of 2 J/cm$^2$ from a black light (FHF32BLB from Toshiba Lighting & Technology Corporation) after the re-alignment treatment and before the attachment of the polarizers.

Example 1b-2

A liquid crystal panel of the present example was produced by the same procedure as that in Example 1 except for the following points.

The liquid crystal material used in the present example was a material prepared by further adding a polymerizable monomer having a structure represented by the following formula (11) to the liquid crystal material used in Example 1 to 0.1 wt % of the liquid crystal material as a whole. The liquid crystal cell was irradiated with non-polarized ultraviolet light with an irradiation dose of 2 J/cm$^2$ from a black light (FHF32BLB from Toshiba Lighting & Technology Corporation) as the polymer sustained (PS) alignment treatment after the re-alignment treatment and before the attachment of the polarizers.

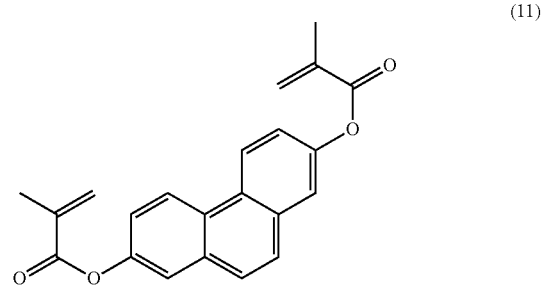 [SMILES: C=C(C)C(=O)Oc1ccc2c(ccc3cc(OC(=O)C(=C)C)ccc32)c1]

(11)

Example 1b-3

A liquid crystal panel of the present example was produced by the same procedure as that in Example 1b-2 except for the following point.

The concentration of the polymerizable monomer was changed from 0.1 wt % to 0.2 wt %.

Example 1b-4

A liquid crystal panel of the present example was produced by the same procedure as that in Example 1b-2 except for the following point.

The concentration of the polymerizable monomer was changed from 0.1 wt % to 0.3 wt %.

Example 1b-5

A liquid crystal panel of the present comparative example was produced by the same procedure as that in Example 1b-2 except for the following point.

The concentration of the polymerizable monomer was changed from 0.1 wt % to 0.4 wt %.

Example 1b-6

A liquid crystal panel of the present comparative example was produced by the same procedure as that in Example 1b-2 except for the following point.

The concentration of the polymerizable monomer was changed from 0.1 wt % to 0.5 wt %.

The following Table 1 shows the evaluation results of these examples determined by the same procedure as that in Example 1.

TABLE 1

| | Monomer ratio/wt % | VHR | Contrast | Flicker |
|---|---|---|---|---|
| Example 1b-1 | 0 | 98% or higher | 1000 or higher | Not perceived through ND50%. Product level. |
| Example 1b-2 | 0.1 | 98% or higher | 1000 or higher | Not perceived through ND50%. Product level. |
| Example 1b-3 | 0.2 | 98% or higher | 1000 or higher | Not perceived through ND20%. Product level. |
| Example 1b-4 | 0.3 | 98% or higher | 1000 or higher | Not perceived through ND20%. Product level. |
| Example 1b-5 | 0.4 | 97% or higher | 1000 or higher | Not perceived through ND10%. Product level. |
| Example 1b-6 | 0.5 | 97% or higher | 1000 or higher | Not perceived through ND10%. Product level. |

In Example 1b-1 in which the liquid crystal cell was irradiated with non-polarized ultraviolet light, the electric characteristics were slightly poorer than those in Example 1 (see the flicker in Example 1b-1). This is presumably because the liquid crystal itself was decomposed by the ultraviolet light.

These results also suggest that an increase in the monomer concentration in the liquid crystal leads to an increase in the number of radicals excited by ultraviolet light, which increases the number of impurity ions generated by the radicals, decreasing the VHR. Also, this tendency is considered to be more significant particularly in the case of low frequency drive. This is because in the flicker test employing low frequency drive, flicker was more significantly perceived as the concentration of the monomer increased.

Furthermore, the results of Table 1 show that from the viewpoint of flicker prevention, the liquid crystal material as a whole preferably has a monomer concentration of lower than 0.4 wt %, more preferably 0.3 wt % or lower, particularly preferably 0.1 wt % or lower.

Example 2

A liquid crystal panel of the present example was produced by the same procedure as that in Example 1 except for the following points.

The IPS electrode substrate was substituted with a substrate that includes in each pixel a TFT formed from an In—Ga—Zn—O-based oxide semiconductor used as the semiconductor material, a planar electrode, and an electrode with electrode slits, so that an FFS mode liquid crystal cell was produced. In the electrode with electrode slits, the width of each electrode portion along an electrode slit was 2.6 μm, and the width of each electrode slit was 3.6 μm. The insulating film between the electrodes for generating fringe electric fields (between the electrode with electrode slits in the upper layer and the planar electrode in the lower layer) was a SiNx film having a thickness of 200 nm. The counter substrate used was a CF substrate.

The flicker test in the present example was performed by the following procedure.

The backlight was turned on, and the liquid crystal panel was left to stand for three hours at 60° C. and a humidity of 95%. Each pixel was driven in a one-pixel polarity-inversion drive mode using the corresponding TFT (in a mode in which the polarities of the applied voltages are opposite between adjacent pixels, and the polarity of each pixel is inverted for each frame). The frame rate was changed in the range of 1 Hz to 50 Hz. The evaluation temperature was 25° C. The evaluation was performed at a grayscale value of 32. Occurrence of flicker was determined by visual observation through a ND filter (10% transmittance).

Hereinafter, the evaluation results of the present example are shown. The contrast was evaluated by the same procedure as that in Example 1.

1) Contrast

The contrast was 1000 or higher.

2) Flicker test

Flicker was not perceived, and the panel was at the product level.

The results show that flicker does not occur even in an FFS mode liquid crystal panel including TFTs formed from an In—Ga—Zn—O-based oxide semiconductor. Flicker did not occur because the off-leakage current of a TFT containing an In—Ga—Zn—O-based oxide semiconductor is lower than the off-leakage current of a TFT containing amorphous silicon (a-Si) or low temperature polysilicon (LTPS), and therefore the applied voltage does not drop in a liquid crystal panel containing an In—Ga—Zn—O-based oxide semiconductor even with a low frame rate. In addition, in an FFS mode, large parallel capacitance is formed between the upper layer electrode and the lower layer electrode, and a drop of the effective voltage applied to the liquid crystal is reduced.

Comparative Example 2-1

A liquid crystal panel of the present comparative example was produced by the same procedure as that in Example 2 except for the following point.

The In—Ga—Zn—O-based oxide semiconductor used as the semiconductor material was substituted with a-Si.

The flicker test in the present comparative example was performed by the following procedure.

The backlight was turned on, and each pixel was driven in a one-pixel polarity-inversion drive mode using the corresponding TFT. The frame rate was changed in the range of 1 Hz to 50 Hz. The evaluation temperature was 25° C. The evaluation was performed at a grayscale value of 32. Occurrence of flicker was determined by visual observation through a ND filter (10% transmittance).

Hereinafter, the evaluation results of the present comparative example are shown. The contrast was evaluated by the same procedure as that in Example 1.

1) Contrast

The contrast was 1000 or higher.

2) Flicker test

Flicker was perceived, and thus the panel failed to reach the product level.

Flicker was perceived because the off-leakage current of a TFT containing a-Si is higher than the off-leakage current of a TFT containing an In—Ga—Zn—O-based oxide semiconductor, and the applied voltage drops in a liquid crystal panel that utilizes a-Si and is driven with a low frame rate.

Comparative Example 2-2

A liquid crystal panel of the present comparative example was produced by the same procedure as that in Example 2 except for the following point.
The In—Ga—Zn—O-based oxide semiconductor used as the semiconductor material was substituted with LTPS.
In the present comparative example, the flicker test was performed by the same procedure as that in Comparative Example 2-1.
Hereinafter, the evaluation results of the present comparative example are shown. The contrast was evaluated by the same procedure as that in Example 1.
1) Contrast
The contrast was 1000 or higher.
2) Flicker test
Flicker was perceived, and thus the panel failed to reach the product level.
Flicker was perceived because the off-leakage current of a TFT containing LTPS is higher than the off-leakage current of a TFT containing an In—Ga—Zn—O-based oxide semiconductor, and the applied voltage drops in a liquid crystal panel that utilizes LTPS and is driven with a low frame rate.

Example 3

A liquid crystal panel of the present comparative example was produced by the same procedure as that in Example 1 except for the following points.
The solids content of the alignment agent was a) a polymer containing a photo-functional group (the same polymer as that in Example 1) and b) polyamic acid obtained by reacting diamine (m-tolidine) represented by the above formula (1) and an acid dianhydride. The acid dianhydride used was one represented by the above formula (2-2) having favorable electric characteristics. The mixing ratio (ratio by weight) of the solids contents a and b was a:b=3:7. The composition (ratio by weight) of the alignment agent was the same as that in Example 1, NMP:BC:solids content=65:30:5. The IPS electrode substrate was substituted with a substrate including a planar electrode and an electrode with electrode slits, so that an FFS mode liquid crystal cell was used. In the electrode with electrode slits, the width of each electrode portion along an electrode slit was 3 μm, and the width of each electrode slit was 5 μm. The electrodes held a SiNx film having a thickness of 300 nm in between as an insulating film.
The following shows the evaluation results of the present example determined by the same procedure as that in Example 1.
1) VHR
VHR was 99% or higher, and was at an acceptable level.
2) Contrast
The contrast was 1000 or higher, and was at an acceptable level.
3) Flicker test
Flicker was not perceived through a ND filter (10% transmittance), and was at an acceptable level.
The liquid crystal panel of the present example was favorable in both the alignment properties and electric characteristics, and achieved favorable display without flicker.

The inventors of the present invention have found that polyamic acid and/or polyimide obtained by reacting m-tolidine have/has an excellent ion-adsorption function. The polyamic acid and/or polyimide, when added to the solids content of an alignment agent, can trap impurity ions present in the liquid crystal, reducing a drop of the applied voltage due to movement of impurity ions involved in inversion of the electric field vectors. This is presumably the reason the present example resulted in higher VHR than Example 1.

Example 4-1

A liquid crystal panel of the present example was produced by the same procedure as that in Example 1 except for the following point.
A liquid crystal cell produced by the same procedure as that in Example 1 was cut on the sealant, so that a liquid crystal cell whose sealant had a width of 0.1 mm was used.

Example 4-2

A liquid crystal panel of the present example was produced by the same procedure as that in Example 1 except for the following point.
A liquid crystal cell produced by the same procedure as that in Example 1 was cut on a sealant, so that a liquid crystal cell whose sealant had a width of 0.2 mm was used.

Example 4-3

A liquid crystal panel of the present example was produced by the same procedure as that in Example 1 except for the following point.
A liquid crystal cell produced by the same procedure as that in Example 1 was cut on a sealant, so that a liquid crystal cell whose sealant had a width of 0.3 mm was used.
The following Table 2 shows the evaluation results of these examples determined by the same procedure as that in Example 1.

TABLE 2

| | Sealant width W | VHR | Contrast | Flicker |
|---|---|---|---|---|
| Example 4-1 | 0.1 mm | 98% or higher | 1000 or higher | Not perceived through ND10%. |
| Example 4-2 | 0.2 mm | 98% or higher | 1000 or higher | Not perceived through ND20%. |
| Example 4-3 | 0.3 mm | 98% or higher | 1000 or higher | Not perceived through ND20%. |

The results show that the width of a sealant does not correlate with VHR, but correlates with flicker. The width does not correlate with VHR presumably because the impurity ions having entered the liquid crystal layer through the sealant portion did not spread sufficiently. Also, as the sealant width increased, the flicker reduction effect increased. This is presumably because the increase in the sealant width was followed by a decrease in the amount of moisture and the number of impurity ions entering the display portion (liquid crystal layer).

Example 5-2

A liquid crystal panel of the present example was produced by the same procedure as that in Example 1a except for the following point.
The insulating film (SiNx film) had a thickness of 500 nm.

Example 5-3

A liquid crystal panel of the present example was produced by the same procedure as that in Example 1a except for the following point.

The insulating film (SiNx film) had a thickness of 700 nm.

The following Table 3 shows the evaluation results of these examples determined by the same procedure as that in Example 1.

TABLE 3

|  | SiNx film thickness | VHR | Contrast | Flicker |
| --- | --- | --- | --- | --- |
| Example 1a | 300 nm | 99% or higher | 1000 or higher | Not perceived through ND50%; product level. |
| Example 5-2 | 500 nm | 99% or higher | 1000 or higher | Not perceived through ND50%; product level. |
| Example 5-3 | 700 nm | 98% or higher | 1000 or higher | Not perceived through ND50%; product level. |

The results show that as the thickness of the insulating film decreases, the VHR increases. This is because a decrease in the thickness of the insulating film leads to an increase in the parallel capacitance, preventing a drop of the applied voltage caused by impurity ions, for example.

Example 6-1

The same liquid crystal panel as that in Example 2 was produced, and was subjected to the following test.

In anticipation of outdoor use of the liquid crystal panel for a product such as a digital signage or smartphone, the luminance of the backlight was changed in a 24-hour cycle. More specifically, the backlight was turned on based on cycles where one cycle consists of 24 hours, namely 12 hours with a luminance of 10000 cd/m² and another 12 hours with a decreased luminance of 1000 cd/m². The liquid crystal panel driven based on this cycle was left to stand for 240 hours at room temperature. Then, the flicker test was performed.

The flicker test in the present example was performed by the following procedure.

Each pixel was driven in a one-pixel polarity-inversion drive mode using the corresponding TFT. The frame rate was changed in the range of 1 Hz to 50 Hz. The evaluation temperature was 25° C. The evaluation was performed at a grayscale value of 32. Occurrence of flicker was determined by visual observation through a ND filter (50% transmittance).

Example 6-2

The same liquid crystal panel as that in Example 2 was produced, and was subjected to the following test.

The liquid crystal panel was left to stand at room temperature for 240 hours while the backlight was turned on with a luminance of 10000 cd/m² for 240 hours. Then, the flicker test was performed by the same procedure as that in Example 6-1.

The following Table 4 shows the evaluation results of these examples. The contrast was evaluated by the same procedure as that in Example 1.

TABLE 4

|  | Backlight lighting method (240 hours, continuously) | Contrast | Flicker |
| --- | --- | --- | --- |
| Example 6-1 | Repeating: 12 hours (10000 cd/m²) lighitng →12 hours (1000 cd/m²) lighting | 1000 or higher | Not perceived through ND50%. |
| Example 6-2 | Always on (10000 cd/m²) | 1000 or higher | Not perceived through ND20%. |

The results show that although the backlight whose light source was the LEDs alone emitted only visible light, the aging in which the cell was exposed to visible light for a long period of time slightly affected the photo-alignment film and/or the liquid crystal, whereby flicker tended to be perceived. Accordingly, in order to reduce the irradiation dose of the visible light to which the liquid crystal cell is exposed, the luminance of the backlight is preferably changed. For example, the luminance of the backlight is preferably adjusted in accordance with the surrounding brightness, or the field sequential mode is preferably employed.

Example 7

A liquid crystal panel of the present example was produced by the same procedure as that in Example 1 except for the following points.

The polymer containing a photo-functional group used was polyamic acid containing an azobenzene skeleton in its main chain. After application of the alignment agent, the substrates were pre-baked at 70° C. for two minutes, and then each alignment film was irradiated with polarized ultraviolet light (alignment treatment). The substrates were then post-baked at 120° C. for 20 minute and at 200° C. for 20 minutes. Each pre-baked alignment film had a thickness of 100 nm as in Example 1.

The evaluation results of the present example determined by the same procedure as that in Example 1 were the same as those in Example 1.

Example 8

A liquid crystal panel of the present example was produced by the same procedure as that in Example 1 except for the following points.

The polymer containing a photo-functional group used was polyamic acid containing a phenyl ester skeleton in its main chain. After application of the alignment agent, the substrates were pre-baked at 70° C. for two minutes, and then each alignment film was irradiated with polarized ultraviolet light (alignment treatment). The substrates were then post-baked at 230° C. for 40 minutes. Each pre-baked alignment film had a thickness of 100 nm as in Example 1.

The evaluation results of the present example determined by the same procedure as that in Example 1 were the same as those in Example 1.

Example 9

A liquid crystal panel of the present example was produced by the same procedure as that in Example 1 except for the following points.

The polymer containing a photo-functional group used was an acrylic polymer containing a cinnamate skeleton in a side chain. After application of the alignment agent, the substrates were pre-baked at 70° C. for two minutes, and then each alignment film was irradiated with polarized ultraviolet light (alignment treatment). The substrates were then post-baked at 150° C. for 20 minutes. Each pre-baked alignment film had a thickness of 100 nm as in Example 1.

The evaluation results of the present example determined by the same procedure as that in Example 1 were the same as those in Example 1.

REFERENCE SIGNS LIST

1: liquid crystal display device (liquid crystal panel)
2: display region
3: pixel
4: sealant
5: backlight
6: LED
6R: red LED
6G: green LED
6B: blue LED
7: light guide plate
8: diffusing sheet
10: substrate (array substrate)
11, 31: photo-alignment film
12, 32: polarizer
13: pixel electrode
14: common electrode
15: trunk
16: branch (comb tooth)
17: interlayer insulating film
18: planar electrode
19: electrode slit
20: electrode with electrode slits
21: insulating film
22: gate line (gate bus line)
23: source line (source bus line)
24: TFT
25: gate electrode
26: semiconductor layer
27: source electrode
28: drain electrode
29: contact hole (through hole)
30: substrate (counter substrate)
40: liquid crystal layer
41: liquid crystal molecule
51, 52: electric field

The invention claimed is:

1. A liquid crystal display device in a transverse electric field mode, comprising:
paired substrates;
a photo-alignment film disposed on at least one of the substrates;
a horizontal alignment liquid crystal layer disposed between the substrates; and pixels arranged in a matrix form,
the liquid crystal layer containing liquid crystal molecules with a bicyclohexyl skeleton and liquid crystal molecules with a difluorobenzene skeleton represented by formula (5-1):

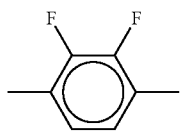

(5-1)

the liquid crystal layer having negative anisotropy of dielectric constant,
one of the substrates including TFTs disposed in the respective pixels,
the TFTs each including a semiconductor layer that contains an oxide semiconductor,
the liquid crystal display device having a frame rate of lower than 50 Hz,
the photo-alignment film containing a photo-reactive polymer, and an ion-adsorption polymer formed from a material different from the material of the photo-reactive polymer,
the photo-reactive polymer being at least one of polyamic acid and polyimide, containing as at least one photo-functional group, a cyclobutane skeleton in its main chain, and
the ion-adsorption polymer being at least one of polyamic acid and polyimide which are obtained by a reaction of m-tolidine and 1,2,3,4-cyclobutanetetracarboxylic dianhydride.

2. The liquid crystal display device in a transverse electric field mode according to claim 1, further comprising a backlight including an LED.

3. The liquid crystal display device in a transverse electric field mode according to claim 2,
wherein the backlight has variable luminance.

4. The liquid crystal display device in a transverse electric field mode according to claim 1,
wherein the liquid crystal layer is formed by sealing, between the substrates, a liquid crystal material containing the liquid crystal molecules with the bicyclohexyl skeleton and the liquid crystal molecules with the difluorobenzene skeleton, and
the liquid crystal material does not contain any polymerizable monomers.

5. The liquid crystal display device in a transverse electric field mode according to claim 1,
wherein the liquid crystal layer is formed by irradiation of a liquid crystal material sealed between the substrates with light,
the liquid crystal material contains the liquid crystal molecules with the bicyclohexyl skeleton, the liquid crystal molecules with the difluorobenzene skeleton, and a polymerizable monomer, and
the liquid crystal material as a whole contains the polymerizable monomer at a concentration of lower than 0.4% by mass before the irradiation with light.

6. The liquid crystal display device in a transverse electric field mode according to claim 1, further comprising
a sealant disposed between the substrates and surrounding the liquid crystal layer,
wherein the sealant has a width of greater than 0.1 mm and 0.3 mm or less.

7. The liquid crystal display device in a transverse electric field mode according to claim 1,
wherein a pre-tilt angle in the liquid crystal layer is substantially zero.

8. The liquid crystal display device in a transverse electric field mode according to claim 1,
wherein the photo-functional group undergoes at least one reaction selected from the group consisting of photo-isomerization, photo-dimerization, photo-cross-linking, photo-decomposition, and photo-Fries rearrangement reactions.

9. The liquid crystal display device in a transverse electric field mode according to claim 1, wherein the polymer further contains, as a photo-functional group, at least one skeleton selected from the group consisting of cinnamate, chalcone, azobenzene, stilbene, coumarin, and phenyl ester skeletons.

10. The liquid crystal display device in a transverse electric field mode according to claim 1,
    wherein the oxide semiconductor is an In—Ga—Zn—O-based oxide semiconductor.

11. The liquid crystal display device in a transverse electric field mode according to claim 1,
    wherein the transverse electric field mode is an IPS mode.

12. The liquid crystal display device in a transverse electric field mode according to claim 1,
    wherein the transverse electric field mode is an FFS mode.

\* \* \* \* \*